(12) United States Patent
Yamaguchi et al.

(10) Patent No.: US 7,007,246 B2
(45) Date of Patent: Feb. 28, 2006

(54) INFORMATION INPUT DEVICE, OPERATION METHOD FOR INFORMATION PROCESSING DEVICE, INFORMATION PROCESSING DEVICE, RECORDING MEDIUM AND PROGRAM

(75) Inventors: Yoshihiro Yamaguchi, Tokyo (JP);
Shinsuke Noguchi, Tokyo (JP);
Kazuaki Takahashi, Tokyo (JP); Takeo Inagaki, Tokyo (JP)

(73) Assignee: Sony Corporation, Tokyo (JP)

( * ) Notice: Subject to any disclaimer, the term of this patent is extended or adjusted under 35 U.S.C. 154(b) by 639 days.

(21) Appl. No.: 10/085,165

(22) Filed: Feb. 27, 2002

(65) Prior Publication Data

US 2002/0158913 A1 Oct. 31, 2002

(30) Foreign Application Priority Data

Feb. 28, 2001 (JP) ............................. 2001-055935

(51) Int. Cl.
*G09G 5/00* (2006.01)
(52) U.S. Cl. ...................... 715/864; 715/810; 345/214; 345/1.1
(58) Field of Classification Search ............. 707/104.1; 345/213, 214, 205, 3.1, 1.2, 1.1; 715/864, 715/810, 514–516, 812, 817–820, 828–830, 715/833, 835, 841, 853, 843, 859, 156, 184
See application file for complete search history.

(56) References Cited

U.S. PATENT DOCUMENTS

| | | | | |
|---|---|---|---|---|
| 6,049,336 A | * | 4/2000 | Liu et al. ..................... | 715/830 |
| 6,208,340 B1 | * | 3/2001 | Amin et al. ................. | 715/808 |
| 6,795,097 B1 | * | 9/2004 | Yamaguchi et al. ........ | 715/817 |
| 6,816,870 B1 | * | 11/2004 | Nishimura et al. ....... | 707/104.1 |
| 2001/0014862 A1 | * | 8/2001 | Hatanaka et al. ........... | 704/500 |
| 2003/0153353 A1 | * | 8/2003 | Cupps et al. ............... | 455/556 |
| 2003/0162569 A1 | * | 8/2003 | Arakawa et al. ............ | 455/566 |

* cited by examiner

Primary Examiner—Tadesse Hailu
(74) Attorney, Agent, or Firm—Frommer Lawrence & Haug LLP; William S. Frommer; Samuel S. Lee

(57) ABSTRACT

As a rotating member of an operating unit is operated, a graphical user interface works so that a band-shaped display area wound on a roll-shaped object looks like being extended upward in visually the same direction as the direction of rotation of the rotating member, from the roll-shaped object. In this case, left and right ends of the roll-shaped object move to look like rotating. When the band-shaped display area is fully extended, the left and right ends stop rotating. Thus, a graphical user interface is provided which does not require a user to repeat troublesome operations until an information processing device executes processing desired by the user, and which enables improvement in user-friendliness.

14 Claims, 28 Drawing Sheets

FIG.4A
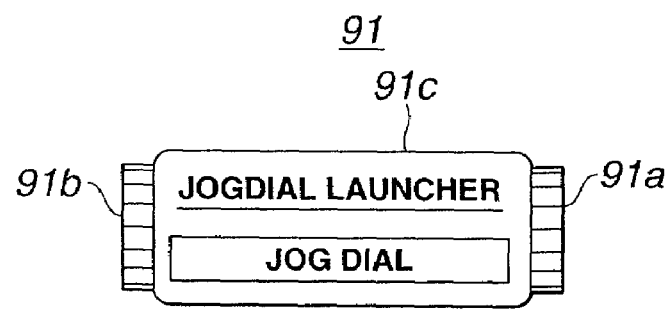
FIG.4B
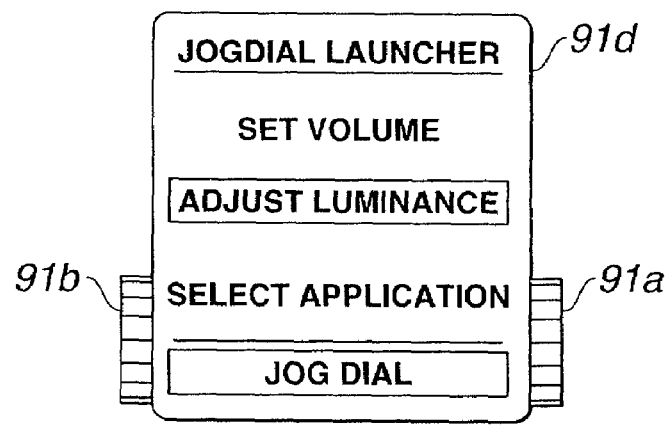
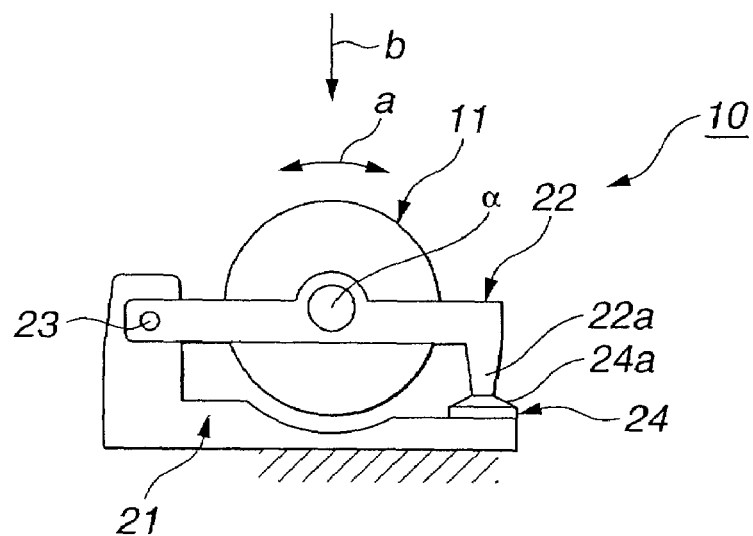
FIG.5

(BACKWARD ROTATION)

(FORWARD ROTATION)

INFORMATION INPUT DEVICE, OPERATION METHOD FOR INFORMATION PROCESSING DEVICE, INFORMATION PROCESSING DEVICE, RECORDING MEDIUM AND PROGRAM

BACKGROUND OF THE INVENTION

1. Field of the Invention

This invention relates to an information input device, an operation method for information processing device, an information processing device, a recording medium and a program which are used for explaining, to a user through an image, the operation on an information processing device of an input device which carries out rotation and press operations.

2. Description of the Related Art

In a portable information processing device, for example, represented by a notebook model personal computer or the like, a cover having a display screen on its inner surface is mounted to be freely opened and closed on a body having a keyboard on its upper surface. In many cases, a touch pad is provided at a part on the upper surface of the body which is before the keyboard and substantially middle in the left-and-right direction of the body. By stroking the touch pad with a fingertip, it is possible to carry out, for example, an operation to move a pointer displayed on the display screen. A left click button and a right click button are typically provided before the touch pad (for example, see Japanese Publication of Unexamined Patent Application No.H11-102234). In this manner, the touch pad and the left and right click buttons in the portable information processing device realize the function of a mouse which is required in a desktop personal computer.

There is also a stick-type unit in which a stick for pointer operation is provided instead of the touch pad. In this unit, the stick is arranged at a part on the upper surface of the body which is in the keyboard and substantially middle in the left-and-right direction of the body. As the top of the stick is moved forward, backward, leftward and rightward with a fingertip, the operation of the pointer is carried out.

There is also a trackball-type unit in which a trackball for pointer operation is provided instead of the touch pad. In this unit, the trackball is arranged at a past on the upper surface of the body which is before the keyboard and substantially middle in the left-and-right direction of the body. As the trackball is rotated with a fingertip, the operation of the pointer is carried out.

In both the stick-type unit and the trackball-type unit, a left click button and a right click button are provided at a part on the upper surface of the body which is before the keyboard and substantially middle in the left-and-right direction of the body.

An example of operating a start menu button on the portable information processing device by using the touch pad and the left and right click buttons will now be described. The start menu button is provided on a task bar and functions as means for opening a start menu which operates as a main place where the user can access a program, a document, system setting and help information. As the start menu button is pointed by the pointer and the left click button is clicked, the start menu is displayed.

The start menu contains menu items such as "program," "search," "setting," and "help." Of these menu items, the "program" menu item enables access to a hierarchically displayed program menu from the start menu. The program menu displays a plurality of application programs and program groups from which the user can select one.

Meanwhile, the user must repeat troublesome operations to select and start a desired application program on the task bar having the start menu button.

Specifically, the user first points the start menu button on the task bar with the pointer and then clicks the left click button to display the start menu. Next, the user points the "program" menu item from the start menu and then clicks the left click button to display the program menu. Then, the user points the representation of a desired application program on the program menu and clicks the left click button. In the case of an application program group, the user must further repeat pointing and clicking. After that, the CPU starts the desired application program.

In this manner, to start the desired application program, the user must frequently operate the touch pad and the left click button. This is hard to use as a user interface. The same is true when clicking a menu item such as "help" from the start menu program to carry out desired processing.

SUMMARY OF THE INVENTION

In view of the foregoing status of the art, it is an object of the present invention to provide an information input device and an operation method for an information processing device which enable improvement in user-friendliness without making the user repeat troublesome operations to execute desired processing on the information processing device.

It is another object of the present invention to provide an information processing device, a recording medium having a program recorded thereon and a program which enable improvement in user-friendliness without making the user repeat troublesome operations to execute desired processing.

An information input device according to the present invention is adapted for, while displaying an image, carrying out an input operation by a user using an input device for carrying out rotation and press operations. The information input device comprises: a first display status for displaying what processing an information processing device can currently carry out in accordance with the operation using the input device; and a second display status for displaying a list of items which can be executed on the information processing device in accordance with the operation using the input device.

An operation method for information processing device according to the present invention is adapted for operating the information processing device while explaining, to a user through an image, the operation on the information processing device of an input device for carrying out rotation and press operations. The method comprises: a first display step of displaying what processing the information processing device can currently carry out in accordance with the operation using the input device; a second display step of displaying a list of items which can be executed on the information processing device in accordance with the operation using the input device; and a function execution step of executing the processing or item selected at the first display step or the second display step.

An information processing device according to the present invention comprises: an input device for carrying out rotation and press operations; and a graphical user interface having a first display status for displaying what processing the information processing device can currently carry out in accordance with the operation using the input device, and a second display status for displaying a list of items which can be executed on the information processing device in accordance with the operation using the input device. The information processing device monitors the operation status in the input device, displays the graphical user interface corresponding to each operation onto a display unit, and carries out information processing corresponding to said each operation.

A recording medium according to the present invention has recorded thereon a graphical user interface processing program for explaining, to a user through an image, the operation on an information processing device of an input device for carrying out rotation and press operations. The graphical user interface processing program comprises: a first display step of displaying what processing the information processing device can currently carry out in accordance with the operation using the input device; and a second display step of displaying a list of items which can be executed on the information processing device in accordance with the operation using the input device.

A program according to the present invention is related to graphical user interface processing for explaining, to a user through an image, the operation on an information processing device of an input device for carrying out rotation and press operations. The program comprises: a first display step of displaying what processing the information processing device can currently carry out in accordance with the operation using the input device; and a second display step of displaying a list of items which can be executed on the information processing device in accordance with the operation using the input device.

BRIEF DESCRIPTION OF THE DRAWINGS

FIGS. 4A and 4B are views for explaining a list view status provided in the specific example of the graphical user interface of the present invention.

FIG. 5 shows the principle of a rotation/press-type operating unit.

DESCRIPTION OF THE PREFERRED EMBODIMENTS

A preferred embodiment of the present invention will now be described with reference to the drawings. In this embodiment, a notebook model personal computer NP as shown in FIG. 1 is used in which a graphical user interface used for explaining the operation of an input device to a user through an image is displayed on a display unit, as will be described later, and a recording medium having a program of the present invention recorded thereon is embedded or loaded to the notebook model personal computer NP, thus carrying out an operation method for information processing device of the present invention.

The notebook model personal computer NP has a body 1 and a cover 2 mounted to be freely opened and closed on the body 1. Specifically, the cover 2 is connected to a rear end portion of the body 1 so that the cover 2 can freely swing around an axial line set in the left-and-right direction. The cover 2 is caused to swing on the body 1 as indicated by an arrow A in FIG. 1, thereby selectively taking a closed state in which the cover 2 is superimposed on the body 1 or an open state in which the cover 2 stands up as shown in FIG. 1. In this specification, the front-and-back direction and the left-and-right direction are set as the directions shown in FIG. 1.

A flat display screen 3 made of liquid crystal or the like is provided on the inner surface of the cover 2. On this display screen 3, a graphical user interface is displayed which is used for explaining the operation of an operating unit 10 as an input device, as will be described later, to a user through an image.

Figure 1:
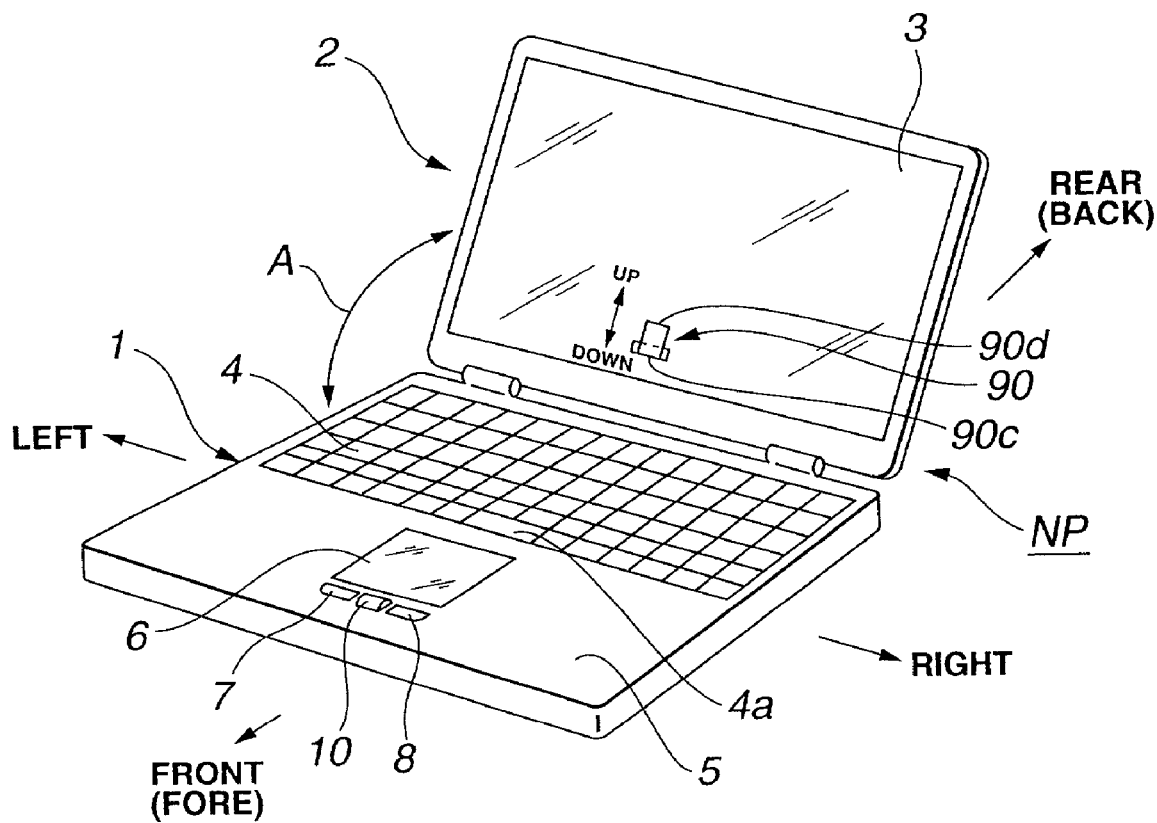
FIG. 1 is a perspective view showing the appearance of a notebook model personal computer as an embodiment of the present invention.

FIG. 1 shows the graphical user interface in a guide status 90 (which will be described later). This guide status 90 is a display status for displaying what processing the notebook model personal computer NP of FIG. 1 can currently carry out and for causing the user to select processing. Other than this guide status 90, the graphical user interface also enters a list view status, which will be described later. The list view status is a display status for displaying a list of items which can be executed in the notebook model personal computer and for causing the user to select an item.

A keyboard 4 is provided on the upper surface of the body 1. This keyboard 4 includes multiple keys such as alphabetic keys, ten keys, and various function keys. The keyboard 4 is elongated in the left-and-right direction as a whole and is situated on the rear portion of the upper surface of the body 1. The portion before the keyboard 4, of the upper surface of the body 1, is a palm rest 5 having a large area.

On the palm rest 5, which is on the upper surface of the body 1 and more specifically before the keyboard 4, a touch pad 6, a left click button 7 and a right click button 8 are provided. As shown in detail in FIG. 2, the touch pad 6 is substantially square and is arranged at a position which is substantially middle in the left-and-right direction of the body 1 and closer to the keyboard 4. More specifically, the back line part of the touch pad 6 extending along the front line part of the keyboard 4 is situated near a space key 4a of the keyboard 4, which is used very frequently. The left and right click buttons 7, 8 are arranged before the touch pad 6 and near the touch pad 6 so that these click buttons are situated substantially in the middle of the left-and-right direction of the body 1. The touch pad 6 is a kind of so-called pointing device, as is already known.

The left click button 7 and the right click button 8 are arranged at a small spacing from each other in the left-and-right direction and a rotation/press-type operating unit 10 is provided in the spacing between the left and right click buttons 7, 8. In this manner, the left click button 7, the operating unit 10 and the right click button 8 are arranged in series in the left-and-right direction of the body 1. The operating unit 10 is situated very close to the left and right click buttons 7, 8 and very close to the touch pad 6.

Figure 2:
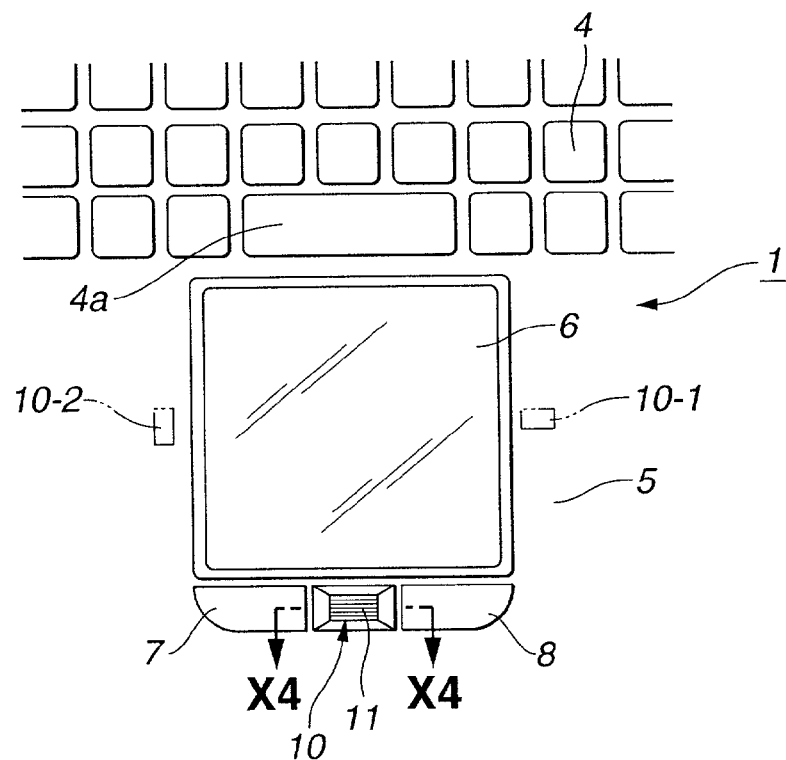
FIG. 2 is an enlarged plan view showing essential parts of FIG. 1.

A specific example of the operating unit 10 will be described later. The operating unit 10 has a rotating member 11. This rotating member 11 is formed to be elongated and extended in the left-and-right direction of the body 1, and a part of the rotating member 11 protrudes slightly upward from the palm rest 5. The rotating member 11 is to be rotated forward and backward around an axial line which is set in the left-and-right direction of the body 1 and substantially parallel to the upper surface of the body 1. The rotating member 11 can also be pressed downward. In FIG. 2, members indicated by chain-dotted lines and denoted by 10-1 and 10-2 are associated with another specific example of the operating unit 10 and these members will be described later.

The rotating member 11 of the operating unit 10 basically has three-dimensional displacement elements such as forward rotation, backward rotation, and press displacement. In addition to these displacement elements, the quantity of rotation in each direction of rotation and the rotation speed based on the calculation of the quantity of rotation can also be provided. In short, a number of different types of operation status of the rotating member 11 are provided and various functions are allocated in accordance with the different types of operation status, thus significantly improving the user-friendliness of the notebook model personal computer NP.

When the user carries out various inputs by using the keyboard 4 with his/her wrists or nearby parts supported on the palm rest 5, the touch pad 6 and the left and right click buttons 7,8 are operated by the user's fingertip. Since the rotating member 11 of the operating unit 10 is near the touch pad 6 and also near the left and right click buttons 7, 8, the user need not largely move his/her hand during the input operation using the keyboard 4 and can rotate and press the rotating member 11, for example, with the tip of his/her forefinger or thumb. Thus, the operability of the rotating member 11 is improved. Moreover, since the rotating member 11 of the operating unit 10 is situated substantially in the middle of the left-and-right direction of the body 1, the operator can operate the rotating member 11 constantly with his/her dominant hand whether the operator is right-handed or left-handed. Therefore, the operability of the rotating member 11 is further improved.

Particularly, in this notebook model personal computer NP, the graphical user interface is displayed in accordance with the operation of the operating unit 10. Processing or an item list is selected on the graphical user interface.

Figure 3A:
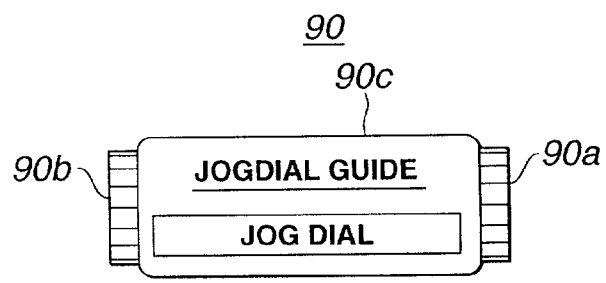
FIGS. 3A and 3B are views for explaining a guide status provided in a specific example of a graphical user interface of the present invention.
Figure 3B:
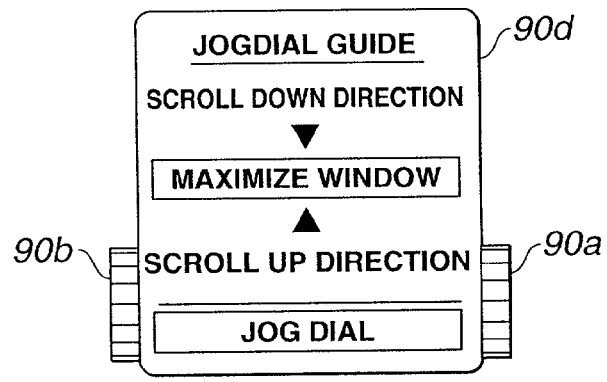

For example, if the rotating member 11 is operated in the direction of a backward arrow in FIG. 1, the graphical user interface (in the guide status 90 in FIG. 1) works so that a band-shaped display area 90d wound on a roll-shaped object 90c as shown in FIG. 3A looks like being extended upward in visually the same direction as the direction of rotation of the rotating member 11, from the roll-shaped object 90c, as shown in FIG. 3B. In this case, left and right ends 90a and 90b of the roll-shaped object 90c move to look like rotating. When the band-shaped display area 90d is fully extended, the left and right ends 90a and 90b stop rotating.

In the guide status 90 shown in FIGS. 3A and 3B, what processing the notebook model personal computer NP of FIG. 1 can currently carry out is displayed on the basis of the operation status of the operating unit 10, and the user is allowed to select processing.

In short, in the guide status 90, it is displayed how the notebook model personal computer NP operates if the operating unit 10 is operated at present. The guide status 90 is effective for displaying while shifting items for designating the functions/operations of the operating system such as scroll and selection of a menu item.

FIG. 3B shows the state in which the graphical user interface displays characters of "scroll down direction" and an inverted triangle as a set in the band-shaped display area 90d, in visual association with the direction of rotation of the rotating member 11 of the operating unit 10. Thus, when the rotating member 11 is rotated in the direction of an arrow indicating the front side shown in FIG. 1, the graphical user interface can explain to the user that the display in the active window can be scrolled down.

The graphical user interface also displays characters of "scroll up direction" and an upright triangle as a set in the band-shaped display area 90d. Thus, when the rotating member 11 is rotated in the direction of an arrow indicating the rear side shown in FIG. 1, the graphical user interface can explain to the user that the display in the active window can be scrolled up.

Moreover, as it is displayed that characters of "maximize window" are surrounded by a rectangular frame, the graphical user interface can explain to the user that the active window can be expanded to the maximum size when the rotating member 11 of the operating unit 10 is pressed.

Furthermore, when the user selects one of the above-described operations by using the operating unit 10 via the guide statues 90, the graphical user interface causes a control unit, which will be described later, of the notebook model personal computer NP to carry out the selected operation.

Other than the guide status 90, the graphical user interface takes a list view status 91 shown in FIGS. 4A and 4B. In the list view status 91, a list of items which can be executed in the notebook model personal computer NP is displayed on the basis of the operation status of the operating unit 10, and the user is allowed to select an item. In short, in the list view status 91, an item list of application programs provided in the notebook model personal computer NP is displayed.

In this list view status 91, too, the graphical user interface works so that a band-shaped display area 91d wound on a roll-shaped object 91c as shown in FIG. 4A looks like being extended upward in visually the same direction as the direction of rotation of the rotating member 11, from the roll-shaped object 91c, as shown in FIG. 4B. In this case, left and right ends 91a and 91b of the roll-shaped object 91c move to look like rotating. When the band-shaped display area 91d is fully extended, the left and right ends 91a and 91b stop rotating.

FIG. 4B shows the state in which a list of items "set volume," "adjust luminance," and "select application" is displayed in the band-shaped display area 91d, in visual association with the direction of rotation of the rotating member 11 of the operating unit 10. As the rotating member 11 is rotated in the direction of the forward or backward arrow shown in FIG. 1, "set volume," "adjust luminance," "select application" or another item is displayed and items which can be executed in the notebook model personal computer NP can be explained to the user. Moreover, the user is allowed to select a desired item by entering the desired item into a rectangular frame at the center. In this case, only the item in the rectangular frame at the center may be displayed with appropriate luminance, while the other items may be displayed with lower luminance than the appropriate luminance or displayed in such a manner as to be clearly distinguished from the item in the rectangular frame.

If no operation of the operating unit 10 is made by the user for a predetermined time period after the band-shaped display areas 90d and 91d of the guide status 90 and the list view status 91 are fully extended upward in visually the same direction as the direction of rotation of the rotating member 11, from the roll-shaped objects 90c and 91c, respectively, the graphical user interface takes up the band-shaped display areas 90d and 91d as if they were rolled up on the roll-shaped objects 90c and 91c, and then erases the band-shaped display areas 90d and 91d. In this case, the left and right ends 90a and 90b of the roll-shaped object 90c move to look like rotating, and after a while, they stop rotating. The graphical user interface will be described further in detail later.

The operating unit 10, with its operation on the notebook model personal computer NP explained by the graphical user interface to the user through an image, will now be described further in detail with reference to FIGS. 5 to 15. First, FIG. 5 shows an exemplary basic structure of the operating unit 10. A numeral 21 represents a board fixed to the body 1. A numeral 22 represents a holding bracket. The holding bracket 22 is mounted on the board 21 so that the holding bracket 22 can freely swing around a fulcrum 23. The rotating member 11 is held by the bracket 22 so that the rotating member 11 is rotatable forward and backward as indicated by an arrow a and the center of rotation is indicated by . The rotating member 11 constitutes a rotary encoder. As will be later described in detail in a specific example, when the rotating member 11 is rotated as indicated by the arrow a, the direction of rotation and the quantity of rotation can be detected.

A contact 24, which is turned ON when pressed, is mounted on the board 21. The holding bracket 22 has a press portion 22a formed thereon right above the contact 24. A movable contact terminal 24a to be an upper contact terminal of the contact 24 is made of a lead spring or the like, and normally, the contact 24 is set to be OFF. As the rotating member 11 is pressed as indicated by an arrow b against the spring force of the movable contact terminal 24a, the movable contact terminal 24a is pressed downward by the press portion 22a, thus turning the contact 24 ON.

Figure 6:
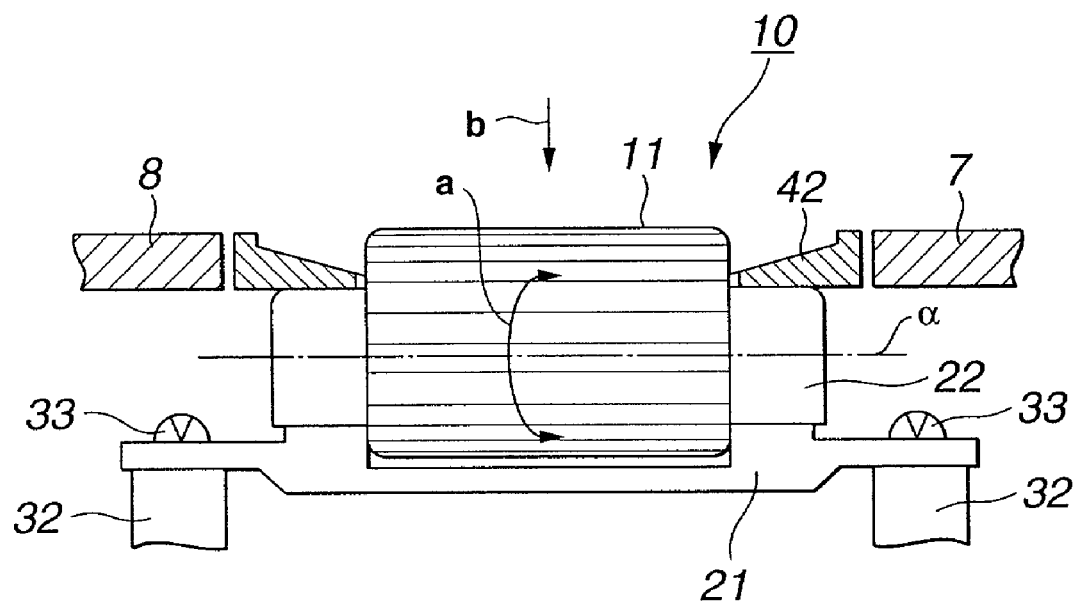
FIG. 6 is a cross-sectional view corresponding to a line X4—X4 in FIG. 2, showing a specific example of the operating unit.

A specific example of the operating unit 10 will now be described with reference to FIGS. 6 to 15. The same constituent elements as those described in FIG. 5 are denoted by the same numerals. The board 21 has a pair of left and right attachment holes 31 (FIG. 7) and is fixed by using screws 33 to attachment boss portions 32 formed in the body 1 (FIG. 6).

Figure 9:
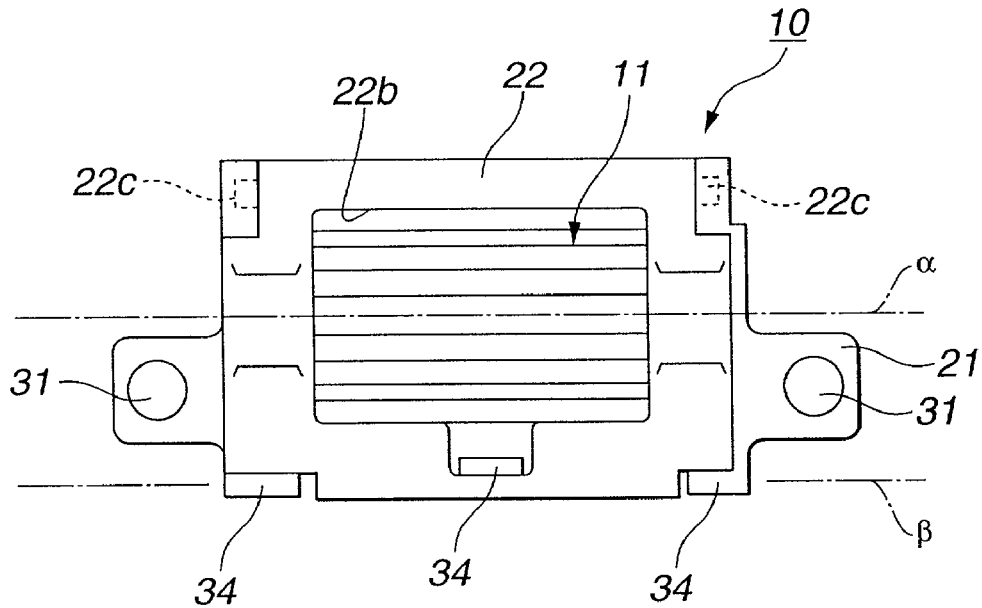
FIG. 9 is a top view of FIG. 7.
Figure 10:
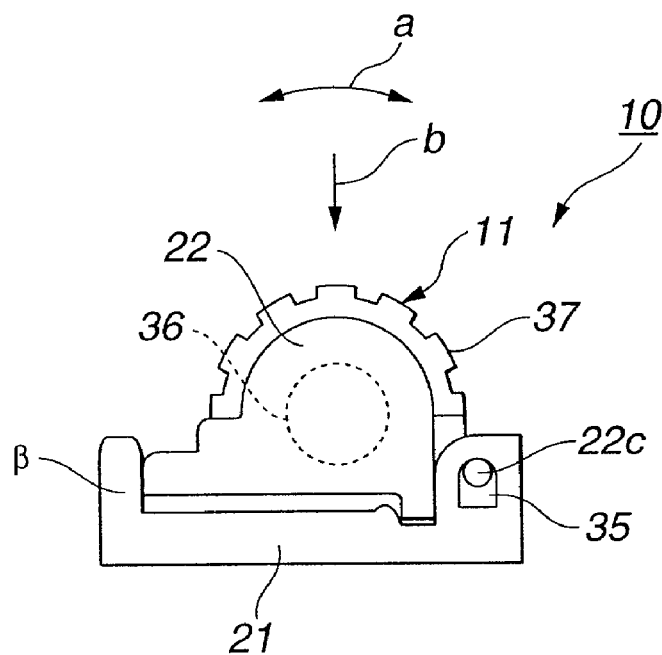
FIG. 10 is a right side view of FIG. 9.

The holding bracket 22 has an aperture 22b having a substantially rectangular shape corresponding to the shape of the rotating member 11 (FIG. 9). One lateral edge portion of the holding bracket 22 is held between a plurality of holding pawls 34 provided in series on the board 21. An axial line connecting the plurality of holding pawls constitutes the swing fulcrum 23 of FIG. 5. The holding bracket 22 is slightly stroke-displaceable substantially straight in the up-and-down direction with respect to the holding pawls 34. The holding bracket 22 has a pair of left and right protruding shaft portions 22c on its other lateral edge portion, which is opposite to the side where the holding pawls 34 are situated. The shaft portions 22c are fitted into a pair of left and right holding holes 35 formed in the board 21 in such a manner that the shaft portions 22c are slightly displaceable in the up-and-down direction (FIGS. 9 and 10). Thus, the holding bracket 22 is held by the board 21 in such a manner that the holding bracket 22 can freely swing around the axial line and is slightly displaceable in the up-and-down direction.

The contact 24 is formed on the board 21 (FIGS. 7 and 8), and the press portion 22a on the lower surface of the holding bracket 22 is formed to be situated immediately above the movable contact terminal 24a having the spring property, as described above (FIG. 8). As the rotating member 11 is pressed, the contact 24 is turned ON. The contact 24 and the press portion 22a are arranged substantially at the middle part in the axial direction of the rotating member 11, and therefore are not to be shown in FIG. 8. However, in order to clarify the relation between the contact 24 and the press portion 22a, in FIG. 8, the positions of the contact 24 and the press portion 22a are slightly shifted in the axial direction of the rotating member 11 from their original positions.

Figure 7:
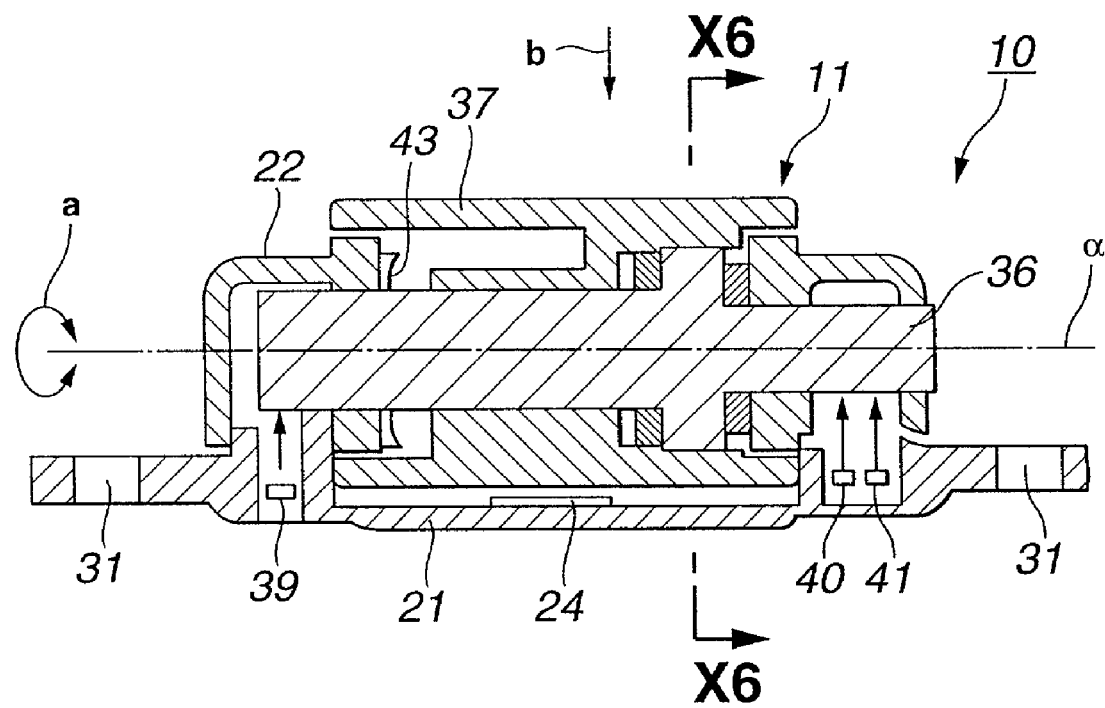
FIG. 7 is a cross-sectional view corresponding to a line X5—X5 in FIG. 8, showing the specific example of the operating unit.
Figure 8:
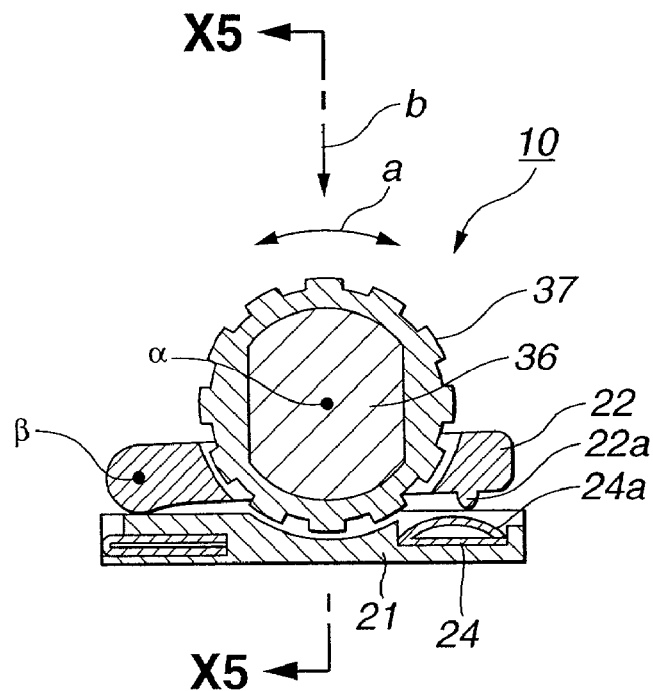
FIG. 8 is a cross-sectional view corresponding to a line X6—X6 in FIG. 7, showing the specific example of the operating unit.

The rotating member 11 has a shaft member 36 and a crust member 37 which is fitted and integrated with the outer circumference of the shaft member 36 (FIGS. 7 and 8). The shaft member 36 constitutes the rotation axis line and its left and right end portions are held by the holding bracket 22 so as to be rotatable forward and backward. Since the crust member 37 is directly touched by the operator, the crust member 37 is made of a soft synthetic resin or the like to restrain slip, and recesses and protrusions are provided at equal spacings in the circumferential direction on the outer circumference of the crust member 37 so as to prevent slip. A part of the crust member 37 is slightly projected above the holding bracket 22 through the aperture 22b of the holding bracket 22. Although not described in detail, the holding bracket 22 has a divided structure consisting of left and right parts in order to facilitate the assembly of the rotating member 11.

Figure 11:
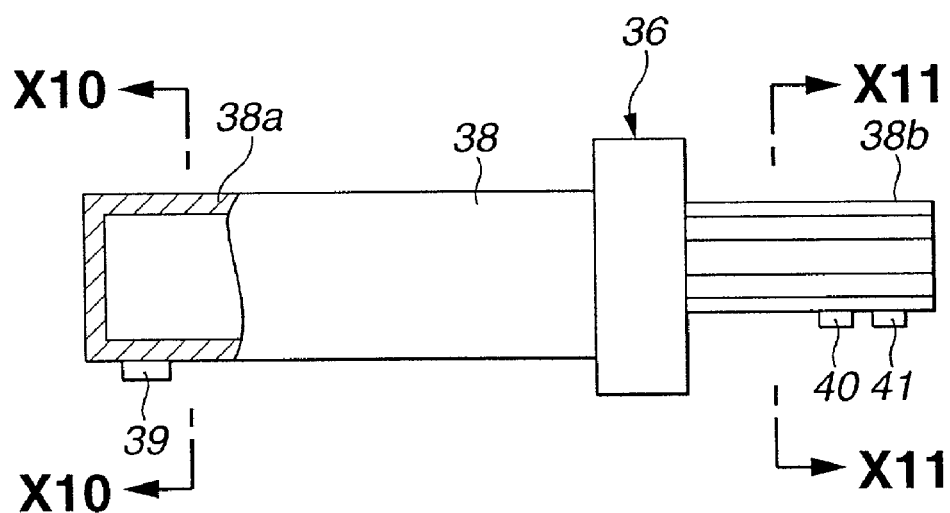
FIG. 11 is a partially cross-sectional side view showing a shaft member constituting a rotating member.
Figure 12:
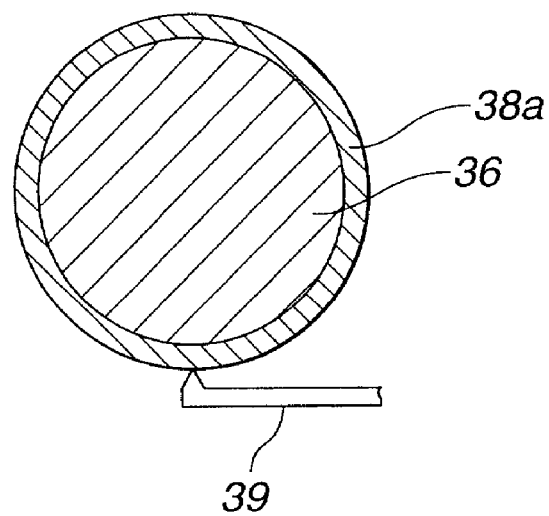
FIG. 12 is a cross-sectional view corresponding to a line X10—X10 in FIG. 11.
Figure 13:
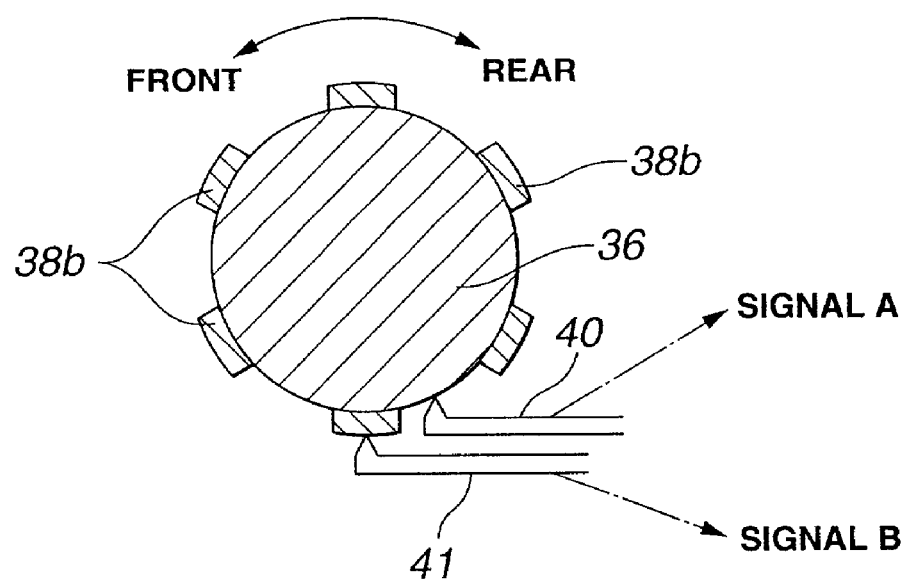
FIG. 13 is a cross-sectional view corresponding to a line X11—X11 in FIG. 11.

Each end portion of the shaft member 36 is not covered by the crust member 37 but is exposed (FIG. 7). While the shaft member 36 itself is made of a synthetic resin or the like to have insulation, a conductive coating 38 is applied on the outer circumference surface of the shaft member 36, as shown in FIGS. 11 to 13. In FIGS. 12 and 13, the conductive coating 38 is represented to be thicker than the actual one in order to clarify its existence.

The conductive coating 38 is set to exist over the whole circumferential length of the shaft member 36 at one end portion of the shaft member 36. This first portion existing over the whole circumferential length is denoted by 38a. At the other end portion of the shaft member 36, the conductive coating 38 is cut off at equal spacings in the circumferential direction of the shaft member 36. This second portion cut off at equal spacings is denoted by 38b.

An elongate input terminal 39 made of a conductive spring material is provided on the board 21, and this input terminal 39 is constantly in contact with the first portion 38a (FIG. 12). Moreover, elongate output terminals 40, 41 made of a conductive spring material are provided on the board 21, and the output terminals 40, 41 are energized toward the second portion 38b of the conductive member 38 (FIG. 13). The two output terminals 40,41 are spaced away from each other in the axial direction of the shaft member 36 and are slightly deviated from each other in the circumferential direction of the shaft member 36.

Figure 14:
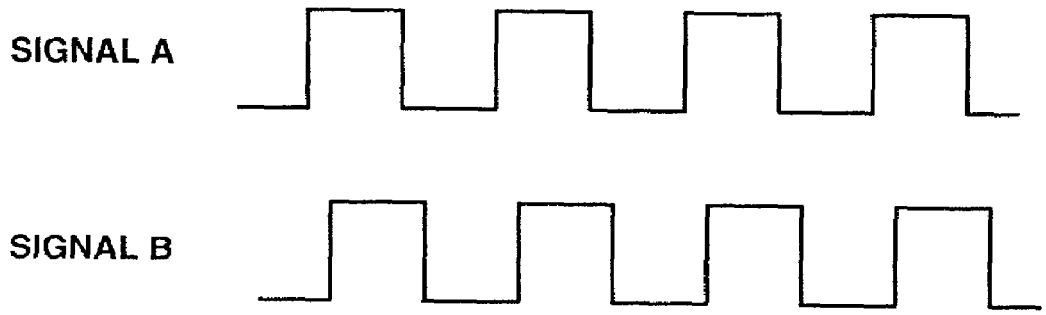
FIG. 14 is a time chart showing a signal status detected at each output terminal when the operating unit is rotated backward.
Figure 15:
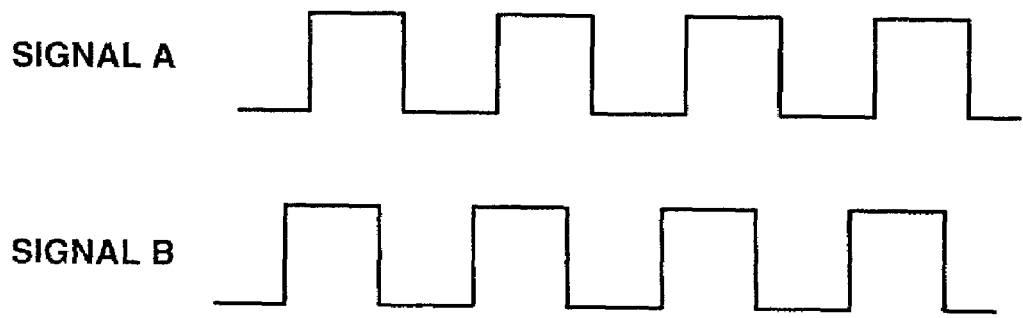
FIG. 15 is a time chart showing a signal status detected at each output terminal when the operating unit is rotated forward.

With a predetermined voltage applied from the input terminal 39, pulse-like voltage signals as shown in FIGS. 14 and 15 are detected from the output terminals 40, 41 in response to the rotation of the rotating member 11. The detected voltage from the output terminal 40 is represented as a signal A and the detected voltage from the output terminal 41 is represented as a signal B. The signal A and the signal B have a time difference in detection point such as a rise point or a fall point of the pulse. As the detection point of the signal A and the detection point of the signal B are compared with each other and which signal is detected first is determined, the direction of rotation of the rotating member 11 is identified. Moreover, by counting the number of detected pulses, it is possible to detect the quantity of rotation of the rotating member 11. By calculating the quantity of rotation per unit time, it is possible to detect the rotation speed of the rotating member 11.

A numeral 42 in FIG. 6 represents an ornamental plate, and a numeral 43 in FIG. 7 represents a leaf spring which provides appropriate rotational resistance to the rotating member 11.

Figure 16:
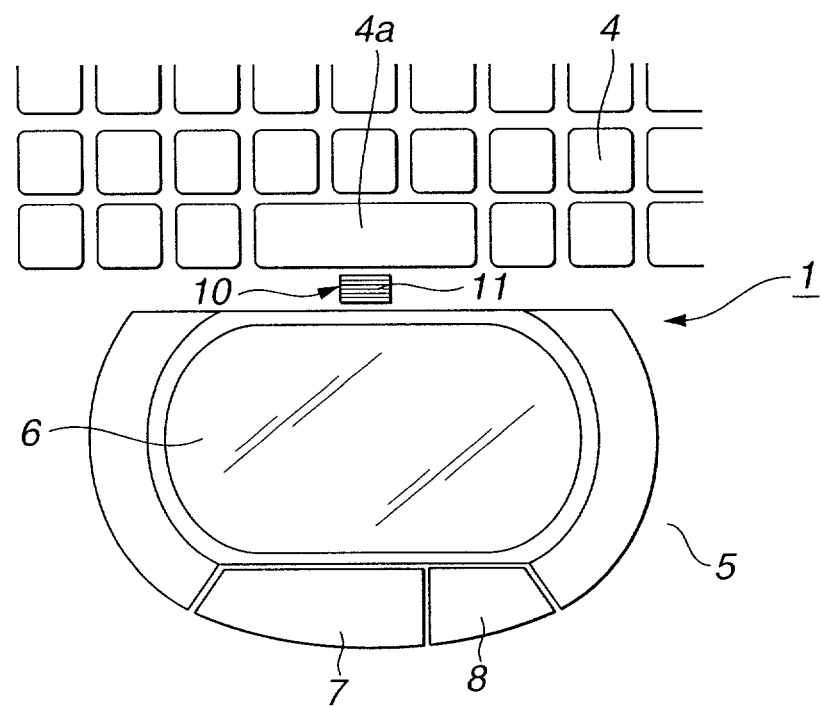
FIG. 16 is a plan view of essential parts corresponding to FIG. 2, showing another specific example of the notebook model personal computer.

FIGS. 16 to 19 show other specific examples of the operating unit 10, similarly to the numerals 10-1, 10-2 indicated by chain-dotted lines in FIG. 2. These specific examples correspond to FIG. 2. Hereinafter, these other specific examples of the operating unit 10 will be sequentially described. First, in the operating unit 10 shown in FIG. 16, compared with the case of FIG. 2, the shape of the touch pad 6 is changed in terms of design so that the left and right lateral edge portions are rounded, and the length in the left-and-right direction of the left click button 7, which is used more frequently, is made longer than the length in the left-and-right direction of the right click button 8, which is used less frequently. The operating unit 10 is arranged between the keyboard 4 and the touch pad 6 in the front-and-back direction. In this specific example, the rotating member 11 of the operating unit 10 is operated only by the user's forefinger.

Figure 17:
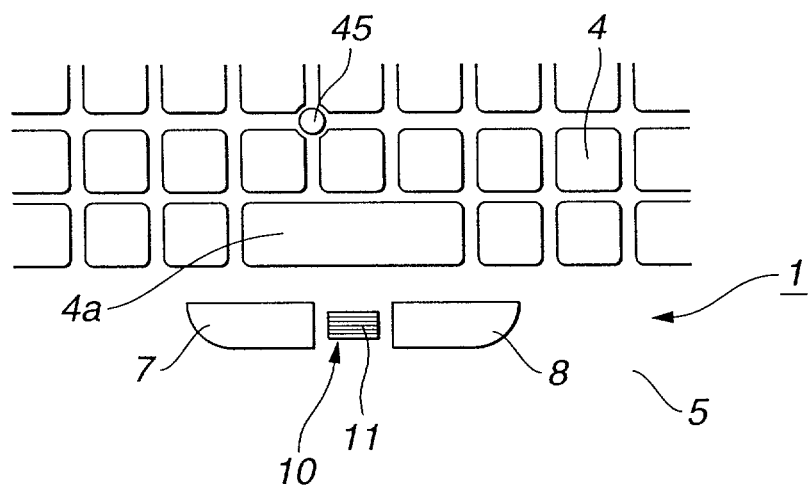
FIG. 17 is a plan view of essential parts corresponding to FIG. 2, showing another specific example of the notebook model personal computer.

FIG. 17 shows the case where a stick-type pointing device is employed. Specifically, a stick 45 extended in the up-and-down direction is provided near the space key 4a of the keyboard 4, and this stick 45 is operated to swing by the user's fingertip. The arrangement of the left and right click buttons 7, 8 and the operating unit 10 is similar to that of FIG. 2. The operating unit 10 is provided between the left click button 7 and the right click button 8 in the left-and-right direction. Since the touch pad 6 does not exist, the left and right click buttons 7, 8 and the operating unit 10 are situated near the keyboard 4 as a whole.

Figure 18:
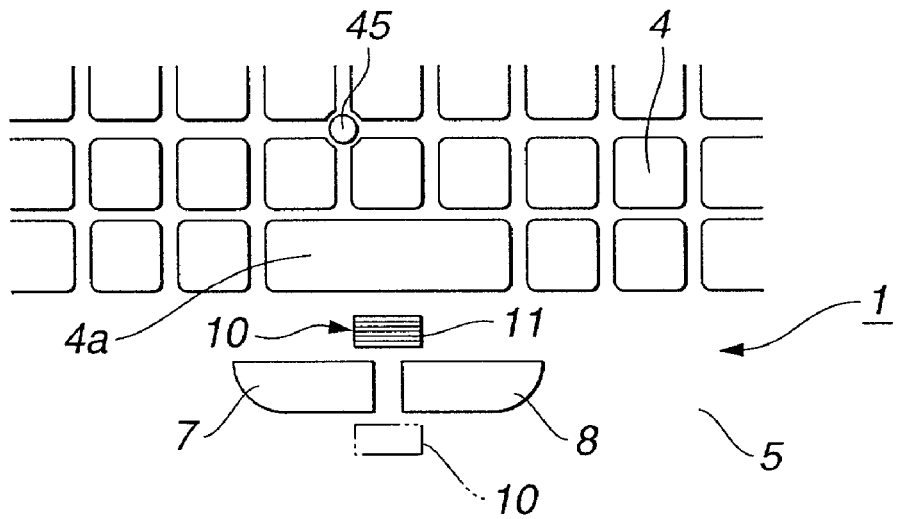
FIG. 18 is a plan view of essential parts corresponding to FIG. 2, showing another specific example of the notebook model personal computer.

FIG. 18 shows the case where a stick-type pointing device is employed similarly to the case of FIG. 17. However, the spacing between the left click button 7 and the right click button 8 in the left-and-right direction is smaller than the spacing in FIG. 17. The operating unit 10, as an example indicated by a solid line, is arranged between the left and right click buttons 7, 8 and the keyboard 4. The operating unit 10, as an example indicated by a chain-dotted line, is arranged before the left and right click buttons 7, 8.

Figure 19:
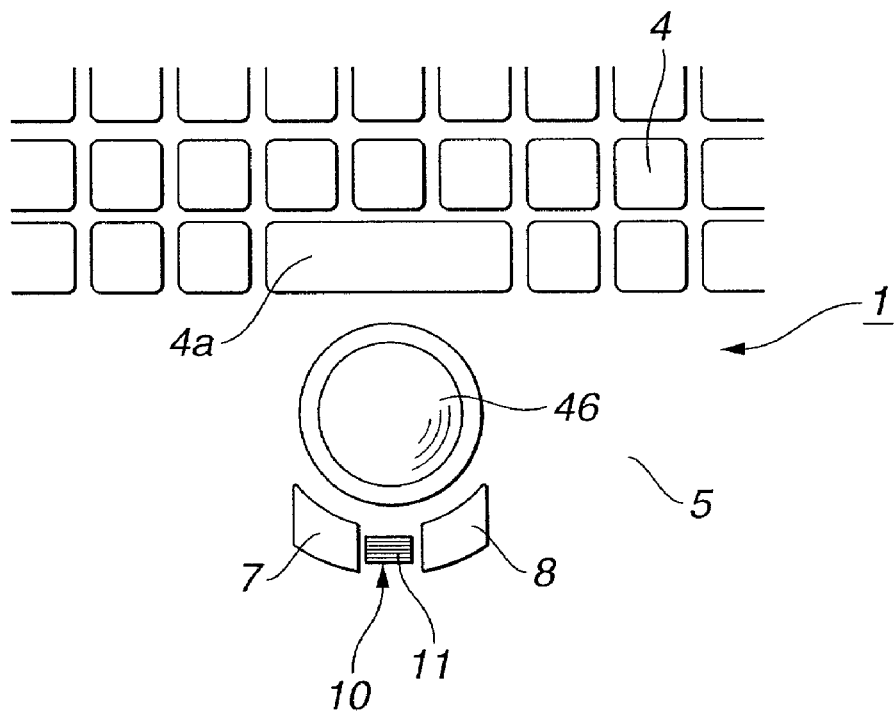
FIG. 19 is a plan view of essential parts corresponding to FIG. 2, showing another specific example of the notebook model personal computer.

FIG. 19 shows the case where a trackball-type pointing device is employed. Specifically, a trackball 46 is rotatably arranged before the keyboard 4, and this trackball 46 is operated to rotate by the user's fingertip. The left and right click buttons 7, 8 and the operating unit 10 area arranged before the trackball 46. The operating unit 10 may also be arranged before the left and right click buttons 7, 8, or may be arranged between the trackball 46 and the keyboard 4.

In another specific example indicated by chain-dotted lines in FIG. 2, there are two operating units 10-1 and 10-2 equivalent to the operating unit 10. The one operating unit 10-1 is provided on the right lateral side of the touch pad 6 and the other operating unit 10-2 is provided on the left lateral side of the touch pad 6. However, the one operating unit 10-1 is rotated in the front-and-back direction around the axial line in the left-and-right direction similarly to the operating unit 10 indicated by a solid line in FIG. 2, whereas the other operating unit 10-2 is rotated in the left-and-right direction as its rotation axis line is set to extend in the front-and-back direction. With respect to the one operating unit 10-1, the graphical user interface shown in FIGS. 1, 3 and 4 explains the operation on the notebook model personal computer NP.

Figure 20:
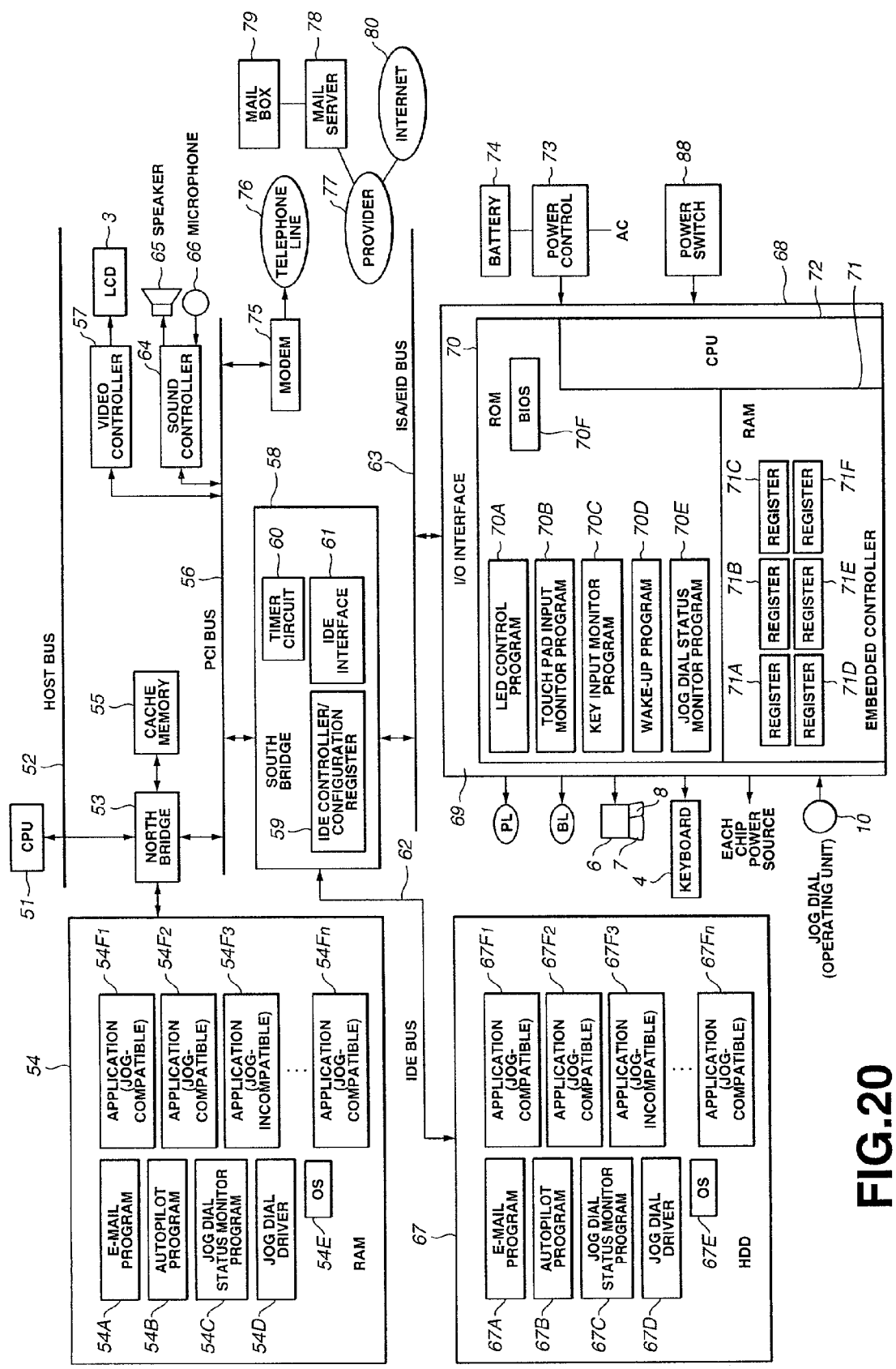
FIG. 20 shows an exemplary electrical structure of the notebook model personal computer.

An exemplary electrical structure of the notebook model personal computer NP which displays the graphical user interface on the display screen 3 will now be described with reference to FIG. 20. In the following description, the operating unit 10 is rotated in the front-and-back direction as in the example indicated by a solid line in FIG. 2. Alternatively, the operating unit 10 is expressed as a jog dial.

A central processing unit (CPU) 51 is constituted by, for example, a Pentium (trademark) processor by Intel Corporation, and is connected to a host bus 52. Moreover, a north bridge 53 is connected to the host bus 52, and the north bridge 53 is also connected to a PCI bus 56. The north bridge 53 is constituted by, for example, 400BX by Intel Corporation, and controls the CPU 51 and the periphery of a main memory 54. The north bridge 53 and a south bridge 58, which will be described later, constitute a so-called chip set.

The north bridge 53 is further connected with the main memory 54 and a cache memory 55. The cache memory 55 is to cache data used by the CPU 51. Although not shown, a primary cache memory is built within the CPU 51, too.

The main memory 54 is constituted by, for example, a DRAM (dynamic random access memory), and stores programs to be executed by the CPU 51 and data necessary for the operation of the CPU 51. Specifically, on completion of the start-up, for example, an e-mail program 54A, an autopilot program 54B, a jog dial status monitor program 54C, a jog dial driver 54D, an operating program (OS) 54E, and other application programs 54F1 to 54Fn are transferred to and stored in the main memory 54 from an HDD 67.

The e-mail program 54A is a program for transmitting and receiving communication texts through a network from a communication channel such as a telephone line 76 via a modem 75, which will be described later. The e-mail program 54A has a received mail acquisition function as a specific function. This received mail acquisition function is to access a mail server 78 of a provider 77 to confirm whether a mail addressed to the user is received in a mailbox 79 or not, and execute processing to acquire a mail addressed to the user if there is such a mail.

The autopilot program 54B is a program for sequentially starting and carrying out a plurality of preset processing or programs in a preset order.

The OS (operating system software) 54E is a program for controlling the basic operation of the computer, such as the so-called Windows 95 and Windows 98 (both of which are trademarks) by Microsoft Corporation and the so-called Mac OS (trademark) by Apple Computer, Inc.

The jog dial status monitor program 54C is a program for receiving a notification from each application as to whether the application is compatible with the jog dial or not, and for operating to display what operation can be carried out by operating the jog dial, that is, the operating unit 10, if the application is compatible with the jog dial. Normally, the jog dial monitor program 54C is waiting for an event from the operating unit 10 and also has a list for receiving a notification from an application. The jog dial driver 54D carries out various functions in accordance with the operation of the operating unit 10.

A video controller 57 is connected to the PCI bus 56 and controls the display on the display screen 3 on the basis of data supplied via the PCI bus 56.

A sound controller 64 is connected to the PCI bus 56 and takes an input from a microphone 66 or supplies an audio signal to a speaker 65. Moreover, a modem 75 is connected to the PCI bus 56. The modem 75 can be connected to a communication network 80 such as the Internet and the mail server 78 via the telephone line 76 and the Internet service provider 77.

Also a south bridge 58 is connected to the PCI bus 56. The south bridge 58 is constituted by, for example, PIIX4E by Intel Corporation, and controls various I/Os (inputs/outputs). Specifically, the south bridge 58 is constituted by an IDE (integrated device electronics) controller/configuration register 59, a timer circuit 60, an IDE interface 61 and the like, and controls the devices connected to the IDE bus 62 and the devices connected thereto via an ISA/EIO (industry standard architecture/extended input/output) bus 63 and an embedded controller 68.

The IDE controller/configuration register 59 is constituted by two IDE controllers, that is, so-called primary IDE controller and secondary IDE controller, and a configuration register (not shown).

The primary IDE controller is connected to a connector (not shown) via the IDE bus 62, and also the HDD 67 is connected to the connector. The secondary IDE controller is electrically connected with connectors of bay devices as IDE devices including a CD-ROM drive, a second HDD, and an FDD, not shown, when these bat devices are loaded thereto via other IDE buses.

An e-mail program 67A, an autopilot program 67B, a jog dial status monitor program 67C, a jog dial driver 67D, an OS (operating system software) 67E and a plurality of application programs 67F1 to 67Fn are stored in the HDD 67. The programs 67A, 67B, 67C, 67D, 67E, 67F1 to 67Fn are sequentially transferred and stored into the RAM 54 in the process of boot-up processing.

Moreover, the embedded controller 68 is connected to the ISA/EIO bus 63. This embedded controller 68 is made up of a microcontroller and is used as an I/O controller. That is, the embedded controller 68 is constituted by interconnecting an I/O interface 69, a ROM 70, RAM 71 and a CPU 72.

In the ROM 70, an LED control program 70A, a touch pad input monitor program 70B, a key input monitor program 70C, a wake-up program 70D, and a jog dial status monitor program 70E are stored in advance.

The LED control program 70A is a program for controlling lighting of a power lamp PL, a battery lamp BL, and if necessary, a message lamp ML and other lamps made of LED. The touch pad input monitor program 70B is a program for monitoring the input by the user from the touch pad 6. The key input monitor program 70C is a program for monitoring the input from the keyboard 4 and other key switches. The wake-up program 70D is a program for checking whether a preset time point has been reached or not on the basis of the current time data supplied from the timer circuit 60 in the south bridge 58, and for managing each chip power source to start predetermined processing (or program) when the preset time is reached.

The jog dial status monitor program 70E is a program for constantly monitoring whether the rotating member 11 in the jog dial, that is, in the operating unit 10, is rotated or pressed. The jog dial status monitor program 70E will be later described in detail.

Moreover, a BIOS 70F is written in the ROM 70. The BIOS is the basic input/output system, which is a software program for controlling transmission (input/output) of data between the OS or application software and the peripheral equipments (display, keyboard, HDD and the like).

The RAM 71 has registers for LED control, touch pad input status, key input status and preset time, and an I/O register for monitoring the jog dial status, as registers 71A to 71F. For example, the LED control register 71A controls lighting of the message lamp ML for displaying an instantaneous boot-up status of e-mail, which will be described later, when the operating unit 10 is pressed. The key input status register 71C is adapted for storing an operation key flag when the operating unit 10 is pressed for single-touch operation, which will be described later. The preset time register 71D can arbitrarily set a certain time point.

The operating unit 10, the touch pad 6, the click buttons 7, 8 and the keyboard 4 are connected to the embedded controller 68 via connectors, not shown. The embedded controller 68 outputs signals corresponding to the operations of the operating unit 10, the touch pad 6, the click buttons 7, 8 and the keyboard 4, to the ISA/EIO bus 63. Also the power lamp PL, the battery lamp BL, the message lamp ML, and the other lamps made of LED are connected to the embedded controller 68.

Moreover, a power control circuit 73 is connected to the embedded controller 68. The power control circuit 73 is connected to an internal battery 74 or an AC power source. The power control circuit 73 supplies necessary power to each block and carries out control to charge the internal battery 74 and the second batteries of the peripheral devices. The embedded controller 68 also monitors a power switch 88 which is operated when turning on and off the power source.

Even when the power source is off, the embedded controller 68 can execute the respective programs 70A, 70B, 70C, 70D and 70E constantly by using the internal power source. In short, these programs are constantly running, even when no windows are opened on the display screen 3 of the LCD. The embedded controller 68 is constantly executing the jog dial status monitor program 70E even when the power switch 88 is off and the OS 54E is not started up on the CPU 51. Particularly, though not described in detail, the embedded controller 68 provides a programmable power key (PPK) function even without having a dedicated key on the notebook model personal computer NP, and enables the user to start up desired software or script file simply by pressing the operating unit 10, in the power-saving status or when the power source is off.

Furthermore, a USB port and an IEEE 1394 port are connected to the embedded controller 68, though not shown. A USB cable is connected to the USB port. To the IEEE 1394 port, for example, a digital video camera is connected via an IEEE 1394 cable, and the IEEE 1394 port is used for taking video signals from the digital video camera into the notebook model personal computer NP.

Figure 21:
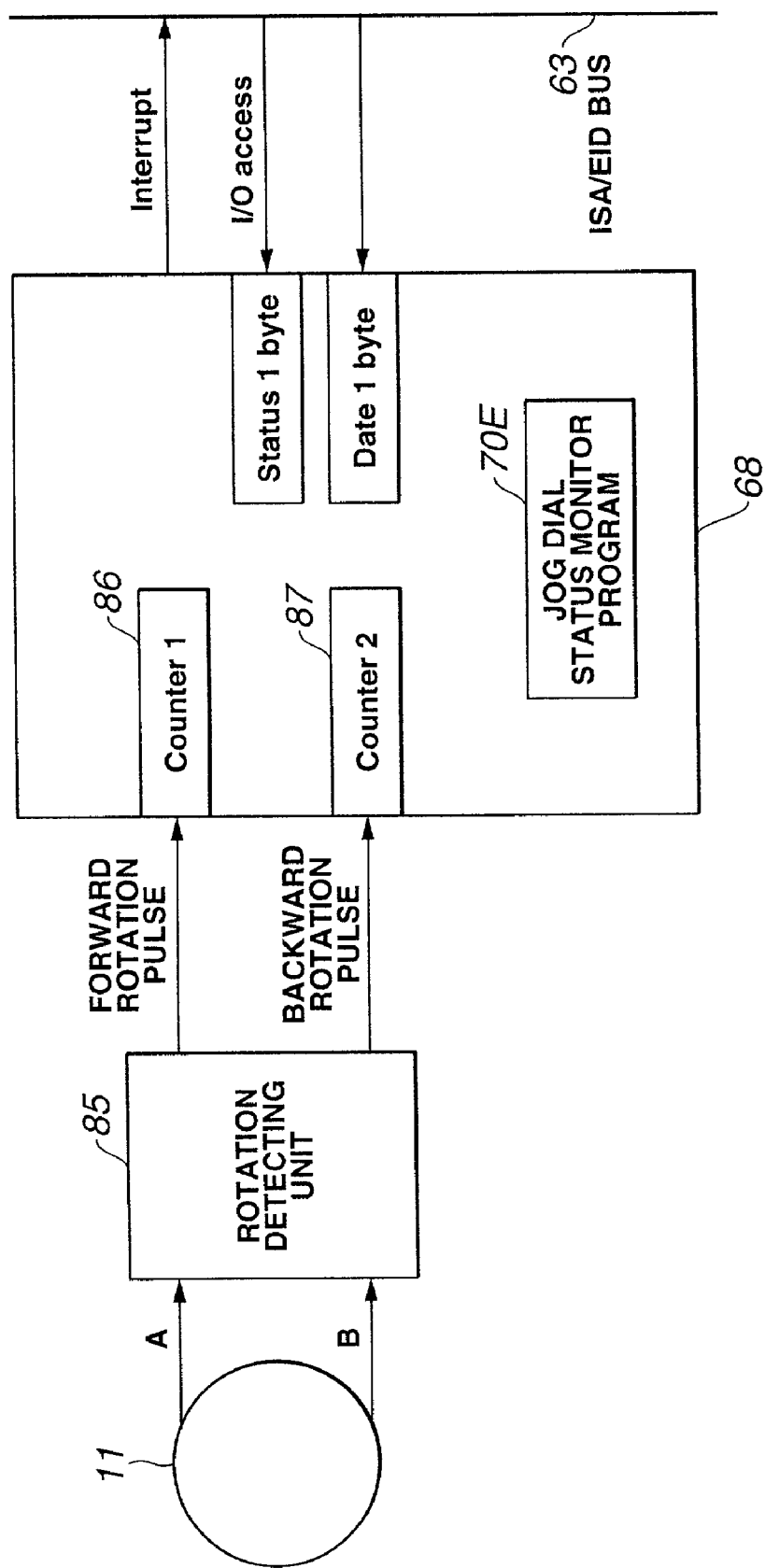
FIG. 21 is a block diagram showing an example of detecting the direction of rotation and the quantity of rotation of the operating unit.
Figure 22:
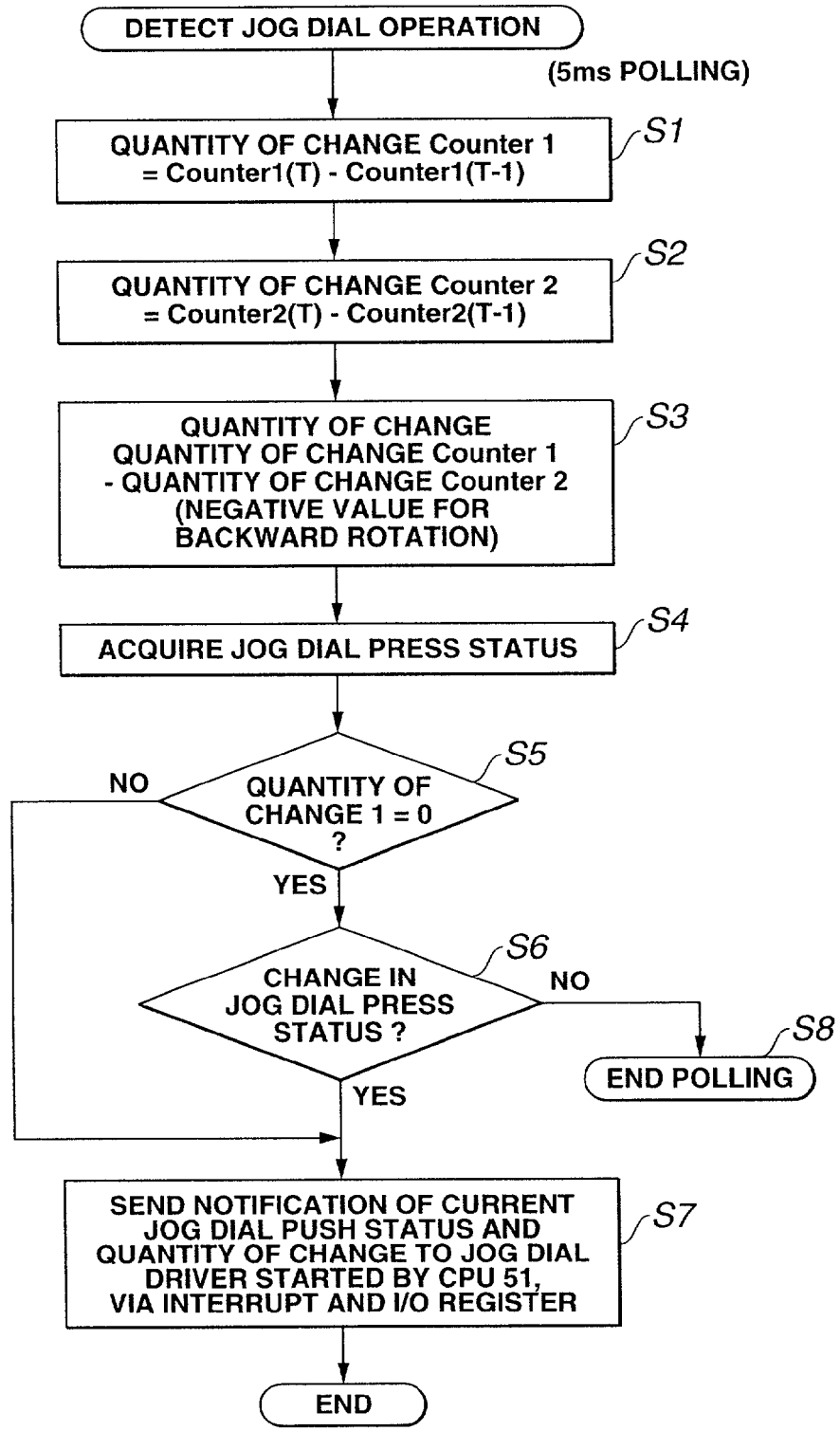
FIG. 22 is a flowchart for detecting the operation status of the operating unit.

The operation of the embedded controller 68 when it executes the jog dial status monitor program 70E will now be described with reference to FIGS. 14, 15, 21 and 22. FIG. 21 shows the hardware structure in which the embedded controller 68 monitors the rotation state of the rotating member 11 of the operating unit 10 via a rotation detecting unit 85. FIG. 22 is a flowchart when the embedded controller 68 executes the jog dial status monitor program 70E.

First, when the rotating member 11 of the operating unit 10 is rotated forward or backward, the rotation detecting unit 85 detects whether it is forward rotation or backward rotation on the basis of the timing of the signal A and the signal B shown in FIGS. 14 and 15. If forward rotation is detected, the rotation detecting unit 85 supplies a forward rotation pulse to a counter (1) 86 of the embedded controller 68. If backward rotation is detected, the rotation detecting unit 85 supplies a backward rotation pulse to a counter (2) 87 of the embedded controller 68. The embedded controller 68 executes the jog dial status monitor program 70E, thus monitoring the quantities of changes of the counter (1) 86 and the counter (2) 87 based on 5-ms polling, the difference in the quantity of change, and whether the operating unit 10 is pressed or not.

At step S1 in FIG. 22, with respect to the forward rotation pulse, a count value Counter1(T−1) at a time T−1 is subtracted from a counter value Counter1(T) at the current time T, thus finding a quantity of change Counter1 of the count value of the counter 86. At step S2, with respect to the backward rotation pulse, a count value Counter2(T−1) at a time T−1 is subtracted from a counter value Counter2(T) at the current time T, thus finding a quantity of change Counter2 of the count value of the counter 87. Then, at step S3, the difference in the quantity of change of the count value is calculated. That is, the difference between the quantity of change Counter1 and the quantity of change Counter2 is calculated. If this difference in the quantity of change has a negative value, it is backward rotation.

At step S4, the press status of the operating unit 10 is acquired. At step S5, the quantity of change calculated at step S3 is judged. At step S6, whether the press status of the operating unit 10 is changed or not is determined. If the quantity of change is detected at step S5, or if a change in the press status is detected at step S6, the processing goes to step S7 and the current press status of the operating unit 10 and the quantity of change are sent through the host bus 52 to the jog dial driver 54D started up by the CPU 51, by interrupt via the I/O register 71F.

If there is no change in the press status of the operating unit 10 at step S6, the processing goes to step S8 and ends polling. Then, the processing from step S1 is repeated again after 5 ms.

Exemplary displays of the graphical user interface corresponding to the input operation by the user using the operating unit 10 will now be described with reference to FIG. 4 and FIGS. 20 to 35. When the CPU 51 executes the jog dial status monitor program 54C after the power switch 88 in the electric circuit diagram of FIG. 20 is turned on, if there is no active application, the roll-shaped object 91c in the list view status 91 as shown in FIG. 4A is displayed on the display screen 3 as the user presses the operating unit 10.

When the user operates the rotating member 11 of the operating unit 10 in the direction of the backward arrow shown in FIG. 1, the list view status 91 works so that the band-shaped display area 91d wound on the roll-shaped object 91c looks like being extended upward in visually the same direction as the direction of rotation of the rotating member 11, from the roll-shaped object 91c, as shown in FIG. 4B. In this case, the left and right ends 91a and 91b of the roll-shaped object 91c move to look like rotating. When the band-shaped display area 91d is fully extended, the left and right ends 91a and 91b stop rotating.

In the band-shaped display area 91d shown in FIG. 4B, a list of items "set volume," "adjust luminance," and "select application" is displayed in visual association with the direction of rotation of the rotating member 11 of the operating unit 10. In practice, the displayed list may include items such as "contrast" and "font." Alternatively, by rotating the rotating member 11 of the operating unit 10 forward and backward, another item list may be scrolled for display in the display area 91d. Thus, in the list view status 91, the items which can be executed in the notebook model personal computer NP can be explained to the user.

For example, in the status shown in FIG. 4B, where "adjust luminance" is in the rectangular frame at the center, if the user rotates the rotating member 11 of the operating unit 10 of FIG. 1 in the direction of the backward arrow, "set volume" disappears from the band-shaped display area 91*d* and "adjust luminance" moves to the uppermost part. "Select application" enters the rectangular frame at the center and an item which was not displayed before, for example, "contrast," appears at the lowermost part.

On the other hand, in the status shown in FIG. 4B, if the user rotates the rotating member 11 of the operating unit 10 in the direction of the forward arrow, "select application" disappears from the band-shaped display area 91*d* and "adjust luminance" moves to the lowermost part. "Set volume" enters the rectangular frame at the center and an item which was not display before, for example, "font," appears at the uppermost part.

The higher the rotation speed of the rotating member 11 of the operating unit 10 is, the faster the item selection is carried out. In short, the rotation speed of the rotating member 11 of the operating unit 10 corresponds to the scroll speed.

Figure 23A:
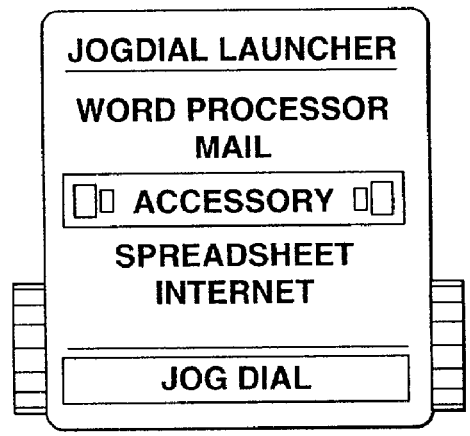
FIGS. 23A to 23C show exemplary displays of the graphical user interface.

Next, if the user operates the rotating member 11 of the operating unit 10 to put a desired item, for example, "select application," into the rectangle at the center and then presses the rotating member 11, applications such as "word processor," "mail," "accessory," "spreadsheet" and "Internet" are displayed as a sub menu of "select application," as shown in FIG. 23A.

These applications "word processor," "mail," "accessory," "spreadsheet" and "Internet" are registered to the launcher in advance, as jog dial-compatible applications. Of course, there are jog dial-incompatible applications and a list of such jog dial incompatible applications may be displayed in the list view status 91.

Figure 23B:
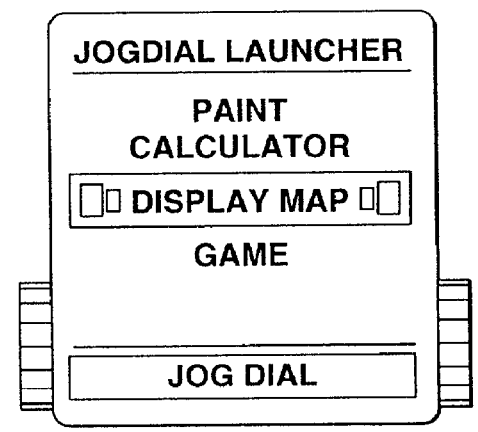
Figure 23C:
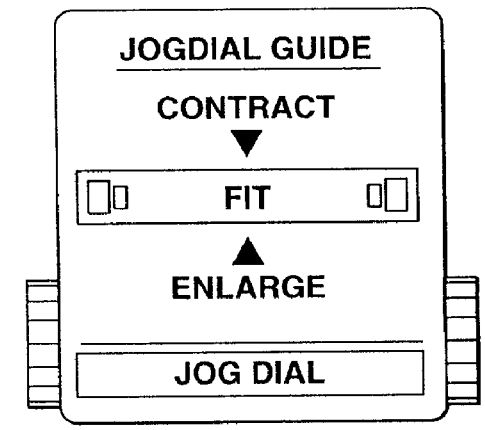

In the status shown in FIG. 23A, if the user rotates the rotating member 11 of the operating unit 10 and presses the rotating member 11 to select "accessory," items such as "paint," "calculator," "display map" and "game" constituting a sub menu of "accessory" are displayed as a secondary hierarchical display, as shown in FIG. 23B. If the user selects and executes an application "display map" by rotating and pressing the operating unit 10 in this secondary hierarchical display, the guide status 90 is containing enlargement, contraction and fitting of zoom is displayed, as shown in FIG. 23C.

Specifically, the application "display map" compatible with the jog dial is executed and this "display map" application is activated. Therefore, the operations which can be processed by the notebook model personal computer NP at this point are displayed by the guide status 90, as shown in FIG. 23C.

The foregoing operations will be summarized as follows. When the power switch 88 is ON and the predetermined OS 54E is started up on the CPU 51, if there is no activated application and the user presses the operating unit 10 only once, the press status of the operating unit 10 is received by the jog driver 54D on the basis of sending of the flag status via the I/O register by interrupt. Thus, the jog driver 54D sends an operation notification to the jog dial status monitor program 54C, which is similarly executed on the CPU 51.

Then, the roll-shaped object 91*c* of the list view status 91 of the graphical user interface is first displayed on the display screen 3. As the user rotates the rotating member 11 of the operating unit 10 in the direction of the backward arrow shown in FIG. 1, the band-shaped display area 91*d* wound on the roll-shaped object 91*c* is extended upward in visually the same direction as the direction of rotation of the rotating member 11.

In the band-shaped display area 91*d*, a list of items "set volume," "adjust luminance" and "select application" is displayed in visual association with the direction of rotation of the rotating member 11 of the operating unit 10 as shown in FIG. 4B. If "select application" is selected by operating the operating unit 10, a list of the jog dial-compatible application software, registered in advance, is displayed as shown in FIG. 23A.

Figure 24:
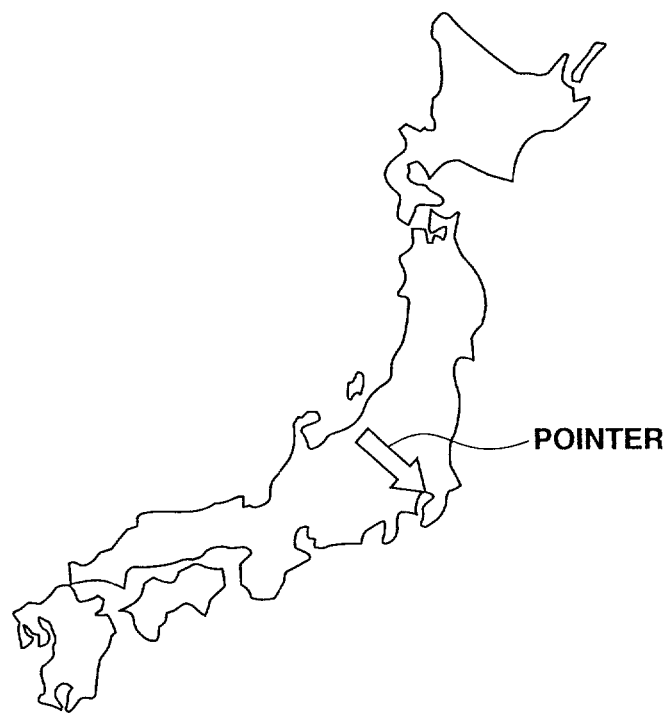
FIG. 24 shows an exemplary display based on an application program for displaying a map.
Figure 25:
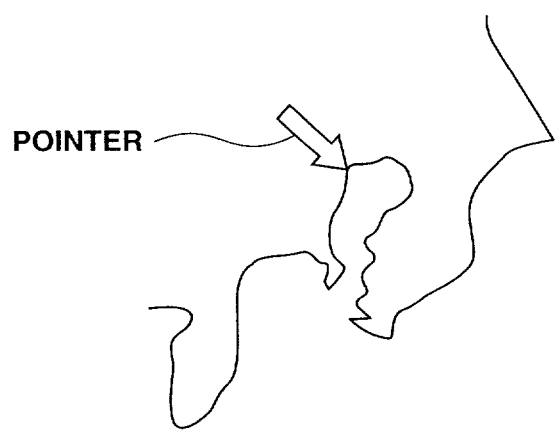
FIG. 25 shows another exemplary display based on the application program for displaying a map.

As an application "display map" is activated by the user's selection using the operating unit 10, a map of Japan shown in FIG. 24 is displayed on the display screen 3. At this point, the guide status 90 is displayed on the display screen as shown in FIG. 23C. If the user rotates the rotating member 11 of the operating unit 10 in the direction of the backward arrow in FIG. 1 while watching the guide status 90, an image centering on a point indicated by a pointer is enlarged, as shown in FIG. 25. On the other hand, if the user rotates the rotating member 11 in the reverse direction of the direction of rotation in the case where the image is enlarged, that is, if the user rotates the rotating member in the direction of the forward arrow in FIG. 1, the image is contracted (that is, the original size is restored). In this manner, in the predetermined application program having the image display function compatible with the jog dial, the image displayed on the display screen 3 can be contracted or enlarged in accordance with the rotation operation of the operating unit 10.

The hierarchical shift operation and display in the list view status 91 will now be described with reference to FIGS. 26A–26C to 30A–30C. An exemplary hierarchical shift from the list view status shown in FIG. 23A, in which a list of jog dial-compatible applications is displayed, to the list view status shown in FIG. 23B will be explained. As a matter of convenience, FIG. 23A shows the primary hierarchy while FIG. 23B shows the secondary hierarchy.

Figure 26A:
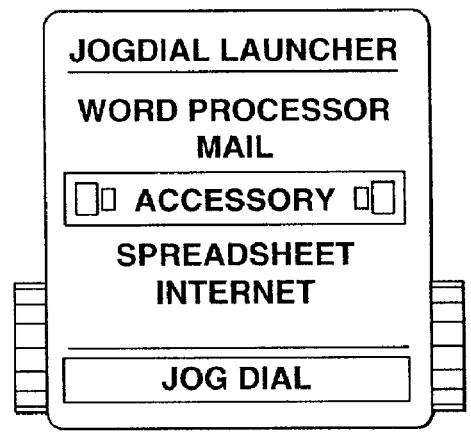
FIGS. 26A to 26C show the process of hierarchical shift of the graphical user interface.
Figure 26B:
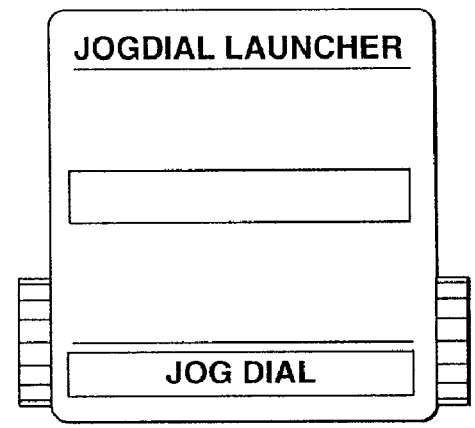
Figure 26C:
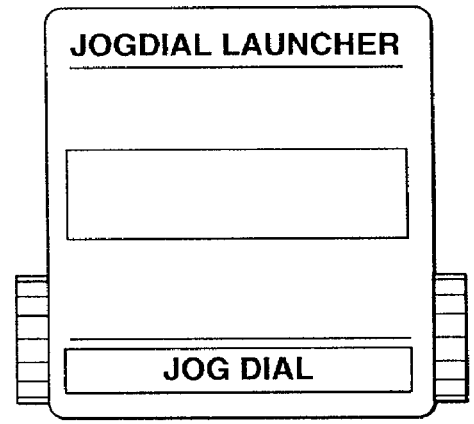
Figure 27D:
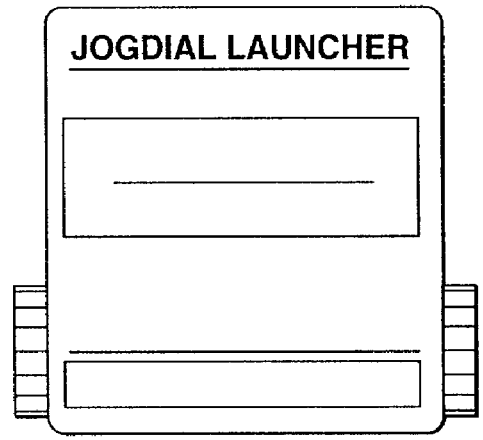
FIGS. 27D to 27F show the process of hierarchical shift of the graphical user interface.
Figure 27E:
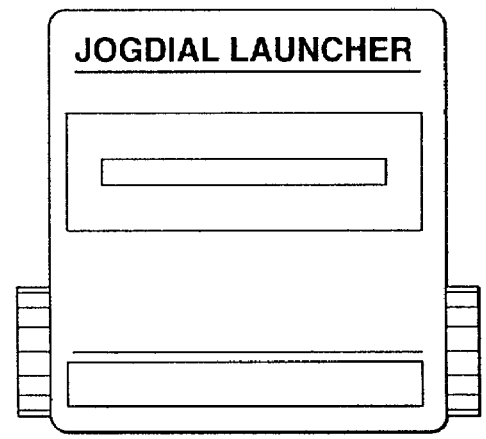
Figure 27F:
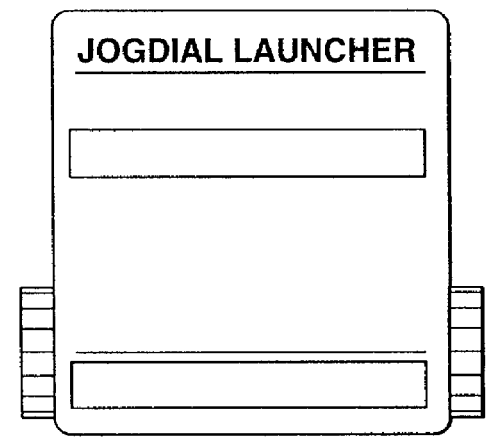
Figure 28G:
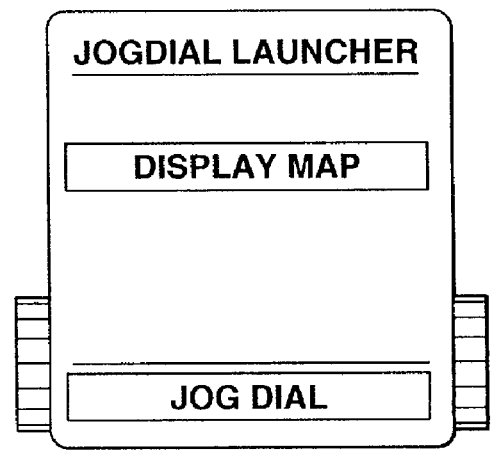
FIGS. 28G to 28I show the process of hierarchical shift of the graphical user interface.
Figure 28H:
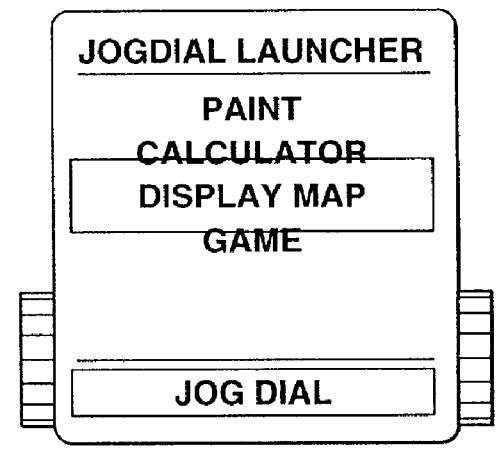
Figure 28I:
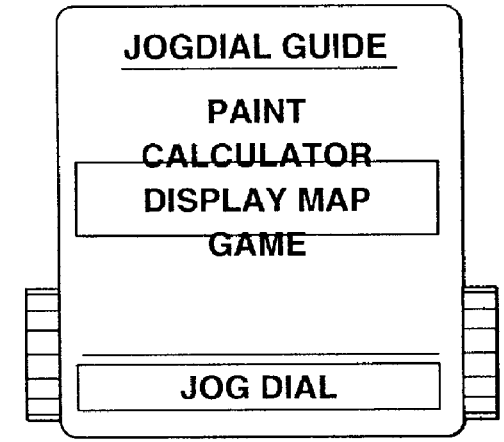
Figure 29J:
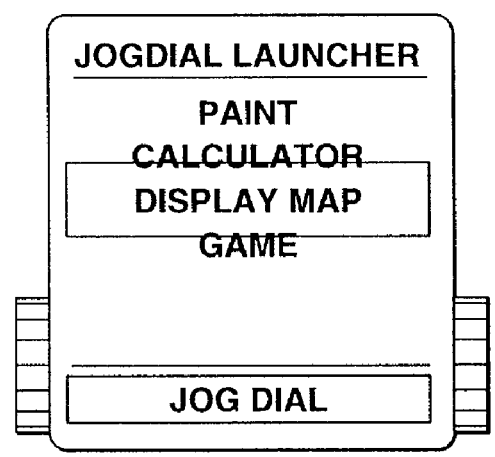
FIGS. 29J and 29K show the process of hierarchical shift of the graphical user interface.
Figure 29K:
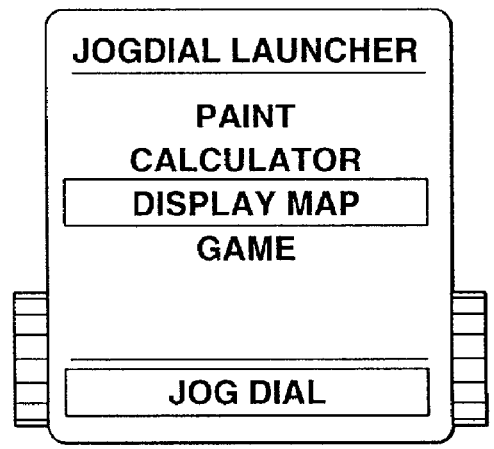

First, it is assumed that an item "accessory" in the list view status shown in FIG. 26A of the primary hierarchy is selected by operating the operating unit 10. Then, the rectangular frame at the center is gradually enlarged as shown in FIGS. 26B and 26C, and after a while, a new frame expands within the enlarged frame as shown in FIGS. 27D, 27E and 27F. Then, "display map", which is an item of the secondary hierarchy of "accessory," is displayed in the frame as shown in FIG. 28G, and other items such as "calculator," "paint" and "game" are displayed as they gradually expand as shown in FIGS. 28H, 28I and 29J. Finally, the items of the secondary hierarchy are displayed in a well-balanced manner as shown in FIG. 29K.

By providing marks for discriminating the current hierarchy near both ends of the rectangular frame at the center in FIGS. 23A to 23C, the user can be aware of the hierarchical shift operation.

Meanwhile, when the operating unit 10 is provided between the left click button 7 and the right click button 8 and near the touch pad 6 as shown in FIG. 1, it is desired to set the guide status 90, rather than the list view status 91, for the initial display of the graphical user interface immediately after the power switch is turned on. This is because the guide status for scroll is preferred in consideration of the linkage with the touch pad 6.

Figure 30A:
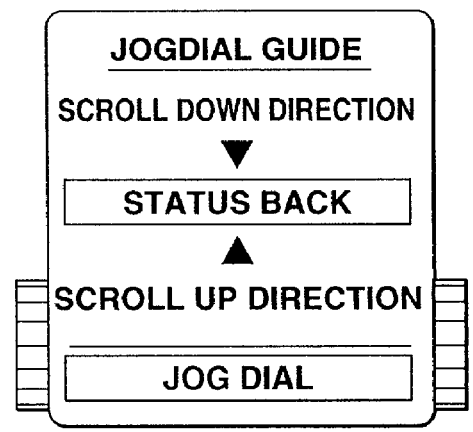
FIGS. 30A to 30C show exemplary displays of the graphical user interface.
Figure 30B:
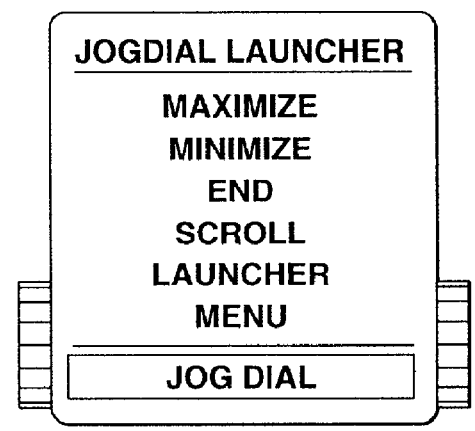
Figure 30C:
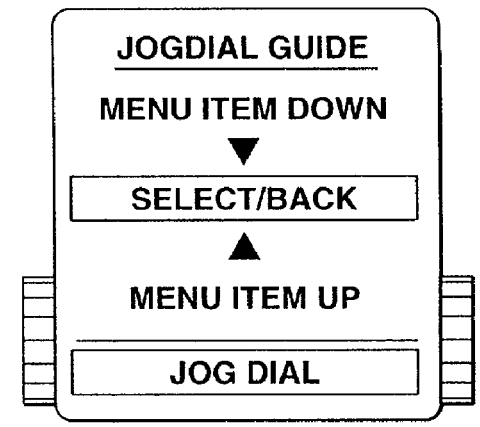

Specifically, after the power switch is turned on, the graphical user interface of the guide status as shown in FIG. 30A is displayed on the display screen 3 as a start display. Thus, the guide status for scrolling is set. If the rotating member 11 of the operating unit 10 is pressed so as to click "status back" in the rectangular frame at the center, the status shifts to the list view status shown in FIG. 30B. If "scroll" is selected in this list view status, the status returns to the guide status of FIG. 30A. If "menu" is selected in the list view status shown in FIG. 30B, the status shift to the guide status shown in FIG. 30C. In the guide status shown in FIG. 30C, selection of menu items in the up-and-down direction can be carried out in accordance with the rotation operation of the operating unit 10. If "select/back" in the frame is pressed by using the operating unit 10, the notebook model personal computer NP is caused to execute the selected menu item. If "select/back" is pressed longer by using the operating unit 10, the list view status shown in FIG. 30B is restored.

Meanwhile, not all the applications that are executed by the notebook model personal computer NP are compatible with the jog dial. That is, not all the applications that are stored in the HDD 67 and are stored into the RAM 54 on completion of the start-up processing of the OS 54E are compatible with the jog dial, and some applications are incompatible with the jog dial, such as the application 54F3. To the jog dial-compatible application and the jog dial-incompatible application, the CPU allocates different processing for the jog dial. Therefore, the jog dial-compatible application carries out notification processing to the jog dial status monitor program 54C, which is executed by the CPU 51.

First, the jog dial-compatible application declares that the application is compatible with the jog dial, to the jog dial status monitor program 54C. Then, the jog dial status monitor program 54C adds that application software to the list of jog dial-compatible software.

After that, the display of the jog dial menu may be changed to an application-specific display in the form of a jog dial guide to the user.

Specifically, the jog dial-compatible application provides the explanation of the jog dial operation in the current status, in the form of character strings, to the jog dial status monitor program 54C. Then, the graphical user interface is displayed and character strings such as jog dial guide, zoom, in, fit, and out are displayed.

The jog dial-compatible application changes the character strings in accordance with the status of the activated window, thus rewriting the list held by the jog dial monitor program 54C.

Therefore, when the jog dial-compatible application is active, the graphical user interface displays the explanation about what operation the application carries out in accordance with the operation of the jog dial, as in the guide status, in the form of character strings.

Specific examples of the jog dial-compatible application software will now be described.

A first specific example is Picture Gear (trademark), which is an image viewer and image shaping tool. This Picture Gear is described in detail on an Internet homepage. In summary, this Picture Gear is software which enables central management of static and dynamic images in a hard disk and various removable media such as a floppy disk, MO, PC card and other card-type memory media. The images can be displayed in a list by predetermined operation and the user can visually recognize a target image at a glance. As image shaping, a 360-degree panorama and a label with a photograph can be prepared. Moreover, this software supports preparation of an HTML album which enables viewing of images on the WWW browser.

Figure 31:
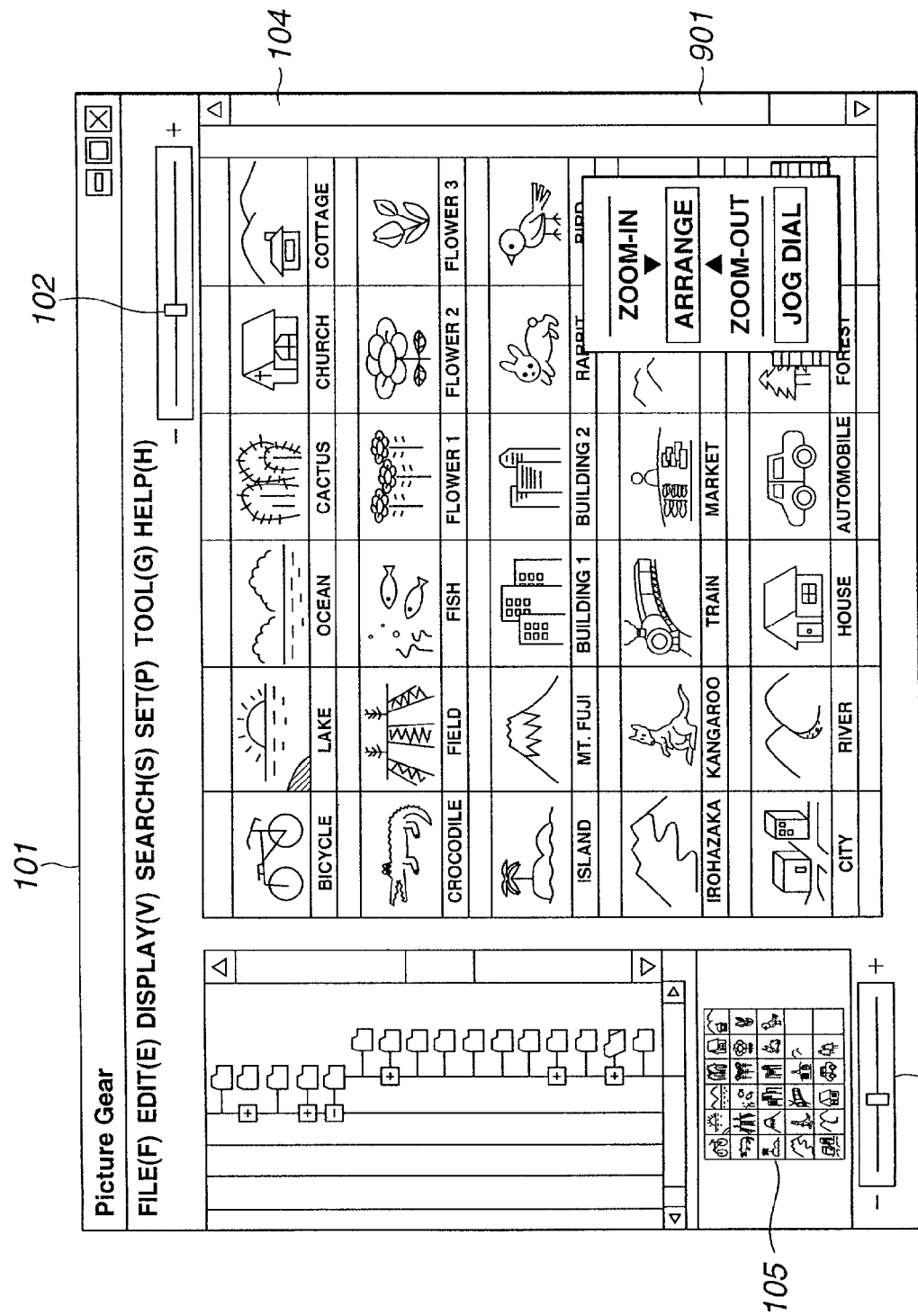
FIG. 31 shows an exemplary display of a window in a first specific example of a jog dial-compatible application.

FIG. 31 shows a Picture Gear window 101. In an image display section 104, a number of images are displayed in a list of an arbitrary zoom status (sheet view display). To see all the images, it suffices to use another image display section 105 with a higher contraction degree. It is also possible to display only one image selected from the sheet view display into the image display section 104. The enlargement/contraction operation of the image display sections 104 and 105 is carried out by slide operating units with gauge for zoom-in/out 102 and 103. For an image list displayed by the sheet view display or by one-picture display, zoom-in/out within a range of, for example, 12.5–800%, can be carried out at a high speed. As the present invention is applied, this zoom-in/out is carried out by rotating and pressing the rotating member 11 of the operating unit 10. The procedure includes displaying a guide status 901 at a predetermined place, for example, on the lower right side, in the window 101 when the Picture Gear is started up. In this case, what happens if the operating unit 10 is operated now is displayed to the user. In the case of the sheet view display, it is displayed in the guide status 901 that the zoom-in/out operation can be carried out and that the operation for aligning the displayed list of images in accordance with the window by push operation. In the case of the one-picture display, it is displayed in the guide status 901 that the zoom-in/out operation can be carried out and that the operation for fitting with the window size can be carried out by push operation.

A second specific example is Navin' You (trademark), which is a map display tool for the current position using the GPS. This Navin' You is described in detail on an Internet homepage. In summary, this Navin' You is software which enables operation of a visually realistic map with perspective representation such that intersections and indications are approaching in accordance with the traveling, as viewed from above, in addition to a conventional flat map display. The height of flight can be freely adjusted by predetermined operation and the pointer can be scrolled at a high speed simply by advancing the pointer in a desired direction. The map can be operated like flying an airplane.

Figure 32:
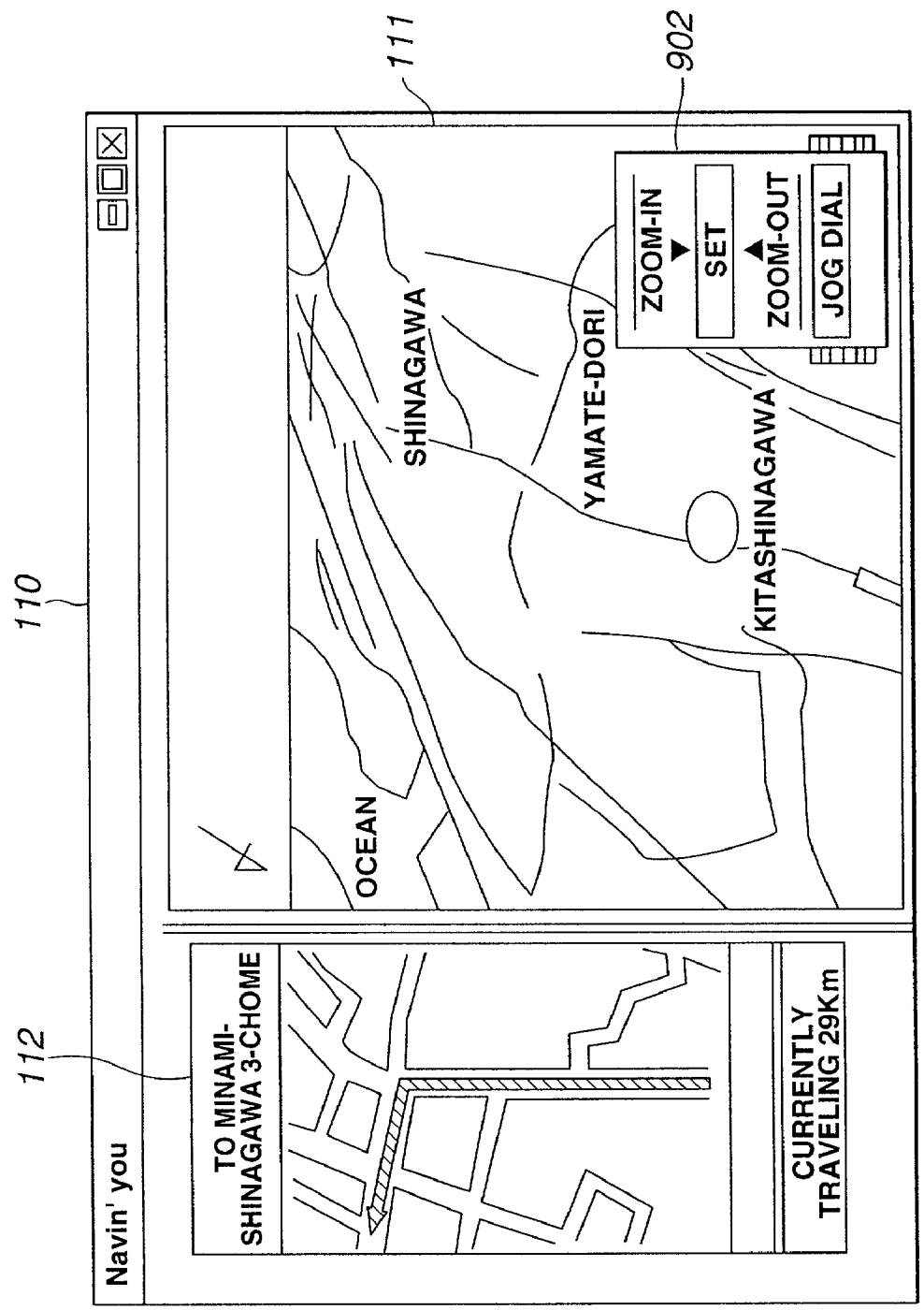
FIG. 32 shows an exemplary display of a window in a second specific example of the jog dial-compatible application.

FIG. 32 shows a Navin' You window 110. A three-dimensional display section 111 and a two-dimensional display section 112 are displayed in the window. Moreover, a guide status 902 of the graphical user interface is displayed, for example, on the lower right side in window 110. In this guide status 902, what happens if the operating unit 10 is operated now is displayed to the user, as described above. In this case, it is displayed that the zoom-in/out operation of the map can be carried out by rotating the rotating member 11 of the operating unit 10, that display of a setting screen which affects the operation can be made by pushing the rotating member 11, and that non-display can be made by re-pushing at the time of displaying the setting screen.

A third specific example is Giga Pocket (trademark) software, which enables recording, reproduction and management of television programs and video images with high quality and by satisfactory operation. This Giga Pocket is described in detail on an Internet homepage. In summary, by a "Giga video recorder" of this Giga Pocket, a television program received by a TV tuner mounted on an MPEG2 real-time encoder board or a video image inputted from an external input terminal of a personal computer, for example, "vaio" (trademark), can be recorded or reproduced with high quality in conformity with the MPEG2 system. The image is recorded onto the hard disk of the personal computer and can be reproduced by random access. Therefore, a recorded scene can be reproduced or another recorded file can be reproduced while continuing the recording. The "Giga video recorder" automatically detects a large change of the screen during the recording and saves a thumbnail screen. It has a "film roll function" in reproduction to horizontally display the thumbnail screen for scroll synchronously with the reproduction. By forwarding the film part and designating an arbitrary point, reproduction can be started at the designated point. Therefore, the user can quickly jump to a scene which the user wants to see and can efficiently enjoy the image. This Giga Pocket is a specific example of the technique related to AV contents recording/reproduction processing, which is disclosed in the specification and drawings of the Japanese Patent Application No.H11-117267 by the present Applicant.

Figure 33:
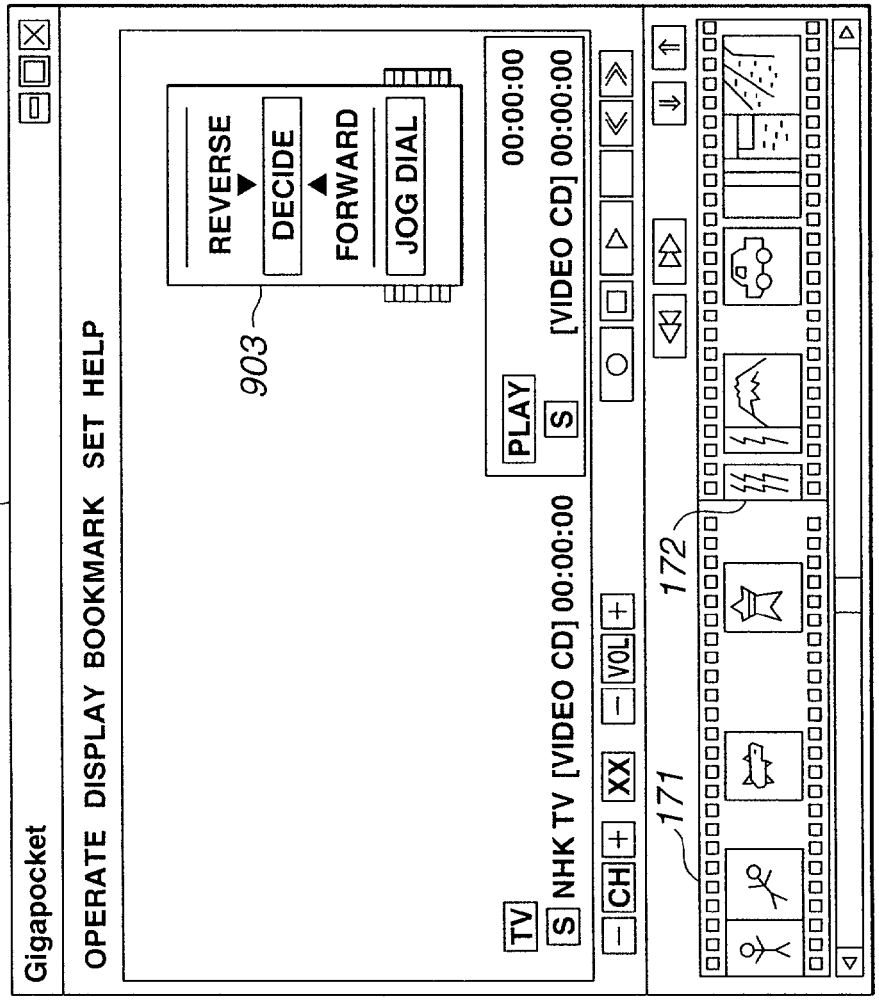
FIG. 33 shows an exemplary display of a window in a third specific example of the jog dial-compatible application.

FIG. 33 shows a Giga Pocket window 115 of such a specific example. FIG. 33 shows the state where the Giga Pocket has been started up, an AV content is reproduced and static images stored in a plurality of static image data files are displayed. A static image display window 171 displays static images stored in a plurality of static image data files (that is, static images at changes of scene) as thumbnail images of a predetermined size. The position in the lateral direction in FIG. 33 of the static image display window 171 corresponds to the time base of an image to be reproduced. The position indicated by a current position indicating gauge 172 corresponds to the current time, that is, the time of an image which is being reproduced. The left side in FIG. 33 indicates a predetermined past time point (where the image was already reproduced) which passed a predetermined time ago corresponding to the distance from the position of the current position indicating gauge 172. The right side in FIG. 33 indicates a future point (where the image will be reproduced) which will come in a predetermined time corresponding to the distance from the position of the current position indicating gauge 172. The thumbnail images are arranged at positions corresponding to the times of changes of scene and are displayed in the static image display window 171. If changes of scene occur in a short time, the thumbnail images are overlapped for display. As the display of the image to be reproduced goes on (that is, as the time passes), the display positions of the thumbnail images shift from right to left in FIG. 33.

By dragging the thumbnail images, only the thumbnail images displayed in the static image display window 171 are scrolled separately from the image which is being reproduced. The distance between the thumbnails constantly reflects the time period between the changes of scene and therefore does not change. With the thumbnail images displayed in the static image display window 171, the user can quickly learn the changes of scene within a predetermined range and can immediately view a desired scene. Thus, using a guide status 903, the above-described "film roll function" is caused to correspond to the rotation and press operations of the rotating member 11 of the operating unit 10 so that the film part is forwarded or rewound by the rotation operation and so that an arbitrary point is decided by the press operation. Therefore, the user can forward or rewind the film part and quickly decide an arbitrary point to start reproduction at this arbitrary point. The user can quickly jump to a desired scene and efficiently enjoy the image.

A fourth specific example is a technique related to an application software which realizes a temporally movable desktop environment by displaying a tag on the desktop, as disclosed in the specification and drawings of the Japanese Patent Application No.H11-108535 (domestic priority application based on the Japanese Patent Application No.H10-321772) by the present Applicant.

Figure 34:
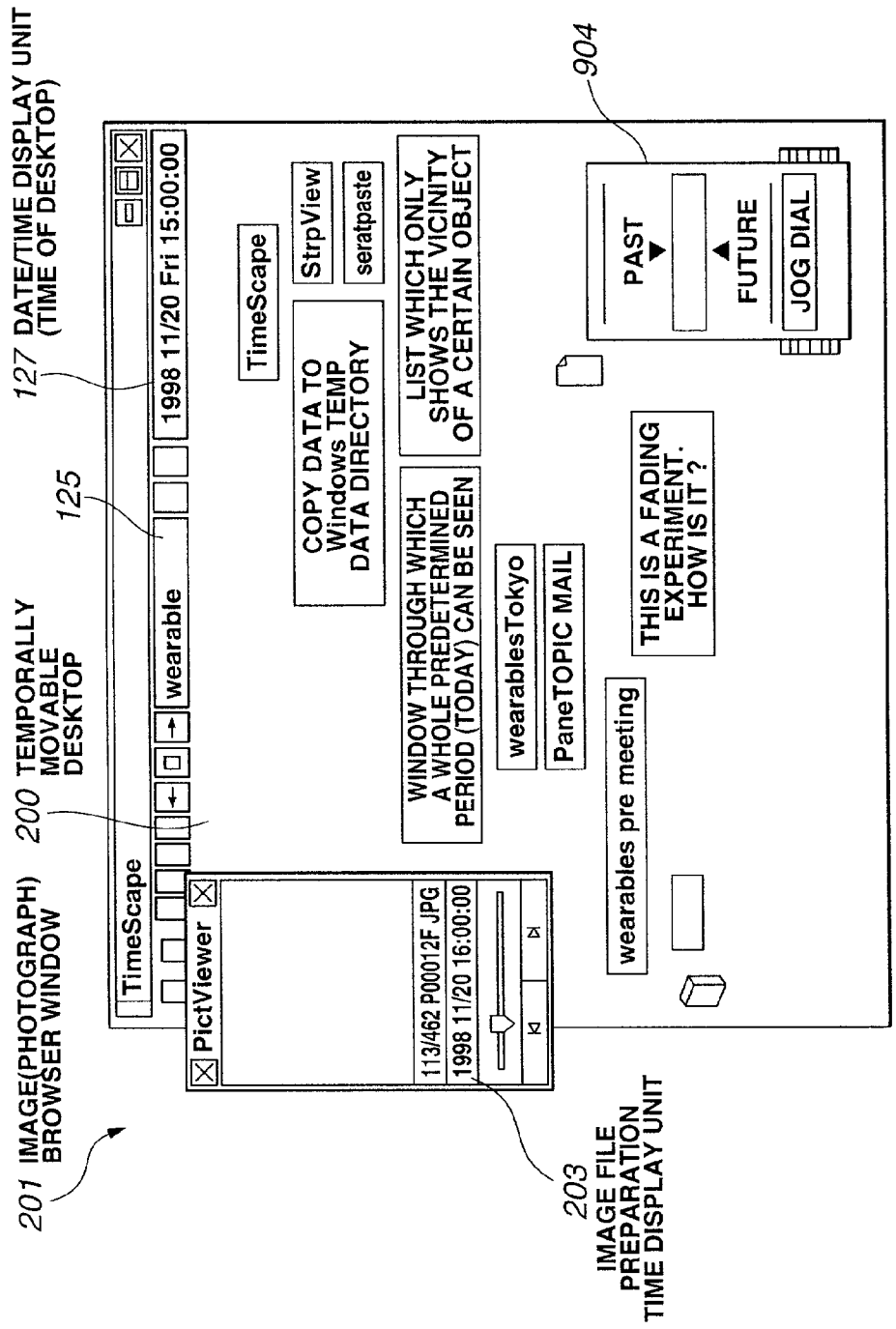
FIG. 34 shows an exemplary display of a window in a fourth specific example of the jog dial-compatible application.

FIG. 34 shows an exemplary display screen in the case where linkage based on time is made between an application which realizes a temporally movable desktop environment and an image browser application. In FIG. 34, it is assumed that search on the desktop is carried out first by the application which realizes the temporally movable desktop environment, and that temporal movement is carried out until a certain character string or icon appears on the desktop. In this example, for example, a character string "wearable" is inputted to a search character input space 125. The character string "wearable" is searched for by the application which realizes the temporally movable desktop environment, and icons and character strings used at the time of a conference related to the character string "wearable" are displayed in a temporally movable desktop window 200. In this example, the desktop environment in a conference of 15:00, Friday, Nov. 20, 1998 is displayed in the window 200, as can be seen from the display contents of a date/time display section 127.

In this manner, when the "time of application" is decided by the application which realizes the temporally movable desktop environment, the time information is sent to the image browser.

Having received the time information, the image browser displays a photograph image which was shot around that time (during the conference), into a window 201. In this example, a photograph image which was shot at 16:00, Nov. 20, 1998 is displayed in the window 201, as can be seen from the display contents of an image file preparation time display section 203.

On the contrary, when the image browser is operated, the status of the desktop at the time point when the photograph image was shot will be reproduced. Therefore, even if there is no particular caption (explanation) appended to the photograph image, it is possible to understand the circumstance in which the photograph was taken.

As the present invention is applied to this technique, the temporal movement operation of the temporally movable desktop window 200 can be carried out by the operating unit 10. A guide status 904 of the graphical user interface is displayed on the lower right side in the temporally movable desktop window 200 and the temporal movement operation to the past and the future is carried out in accordance with the rotation of the rotating member 11.

Other specific examples (fifth to tenth examples) of the jog dial-compatible application and the operation thereof will be briefly described hereinafter. A fifth specific example is Smart Write (trademark), which a simplified word processor. In this Smart Write, scroll up/down by rotating the rotating member 11 of the operating unit 10 and jump to the top of the text by pressing the rotating member 11 are displayed in the guide status of the graphical user interface.

A sixth specific example is Smart Script Editor (trademark), which is an application automatic execution tool based on script. In this Smart Script Editor, step execution by rotating the rotating member 11 of the operating unit 10 and pause by pressing the rotating member 11 in reproduction or recording are displayed in the guide status of the graphical user interface.

A seventh specific example is DV Gate Motion (trademark), which is a digital video reproducing/editing tool. In this DV Gate Motion, feeding frames forward or back during pause by rotating the rotating member 11 of the operating unit 10 and marking by pressing the rotating member 11 are displayed in the guide status of the graphical user interface.

An eighth specific example is Smart Capture (trademark), which is a static/dynamic image intake tool for a digital video camera. In this Smart Capture, the functions based on the scroll and press operations are varied among a finder screen, a still viewer and a movie player. This enables change and display of character strings in accordance with the status of an activated window. On the finder screen, setting of each effect level can be carried out by scrolling.

For example, setting of the level of an effect such as adding a white noise is carried out. On the still viewer, selection of a displayed static image is carried out by rotating the rotating member 11 and mail software (mailer) is started up by pressing the rotating member 11. The mailer in this case is effective when a static image is used as an attachment file. On the movie player, selection of a displayed dynamic image frame is carried out by scrolling and the same mailer as described above is started up by pressing.

A ninth specific example is Media Bar (trademark), which is a music-related reproduction tool. In this Media Bar, reproduction of the next tune or the previous tune is selected by scrolling the rotating member 11 of the operation unit 10 and pause is made by pressing the rotating member 11.

A tenth specific example is a jog dial browser, which is a tool for browsing a folder by using the operating unit 10. A list is scrolled up and down by rotating the rotating member 11 of the operating unit 10. If a folder is selected, a file list under the folder is displayed by pressing the rotating member 11. If data/program is selected, it is executed by pressing the rotating member 11. If cancel is selected, the operation is ended by pressing the rotating member 11. If return is selected, a file list of a folder immediately above is displayed by pressing the rotating member 11.

When the applications of the above-described specific examples are overlapped on the display screen 3, the single guide status of the graphical user interface has the respective applications. The processing corresponding to the operating unit 10 is displayed, which is varied in accordance with the active application window.

Figure 35:
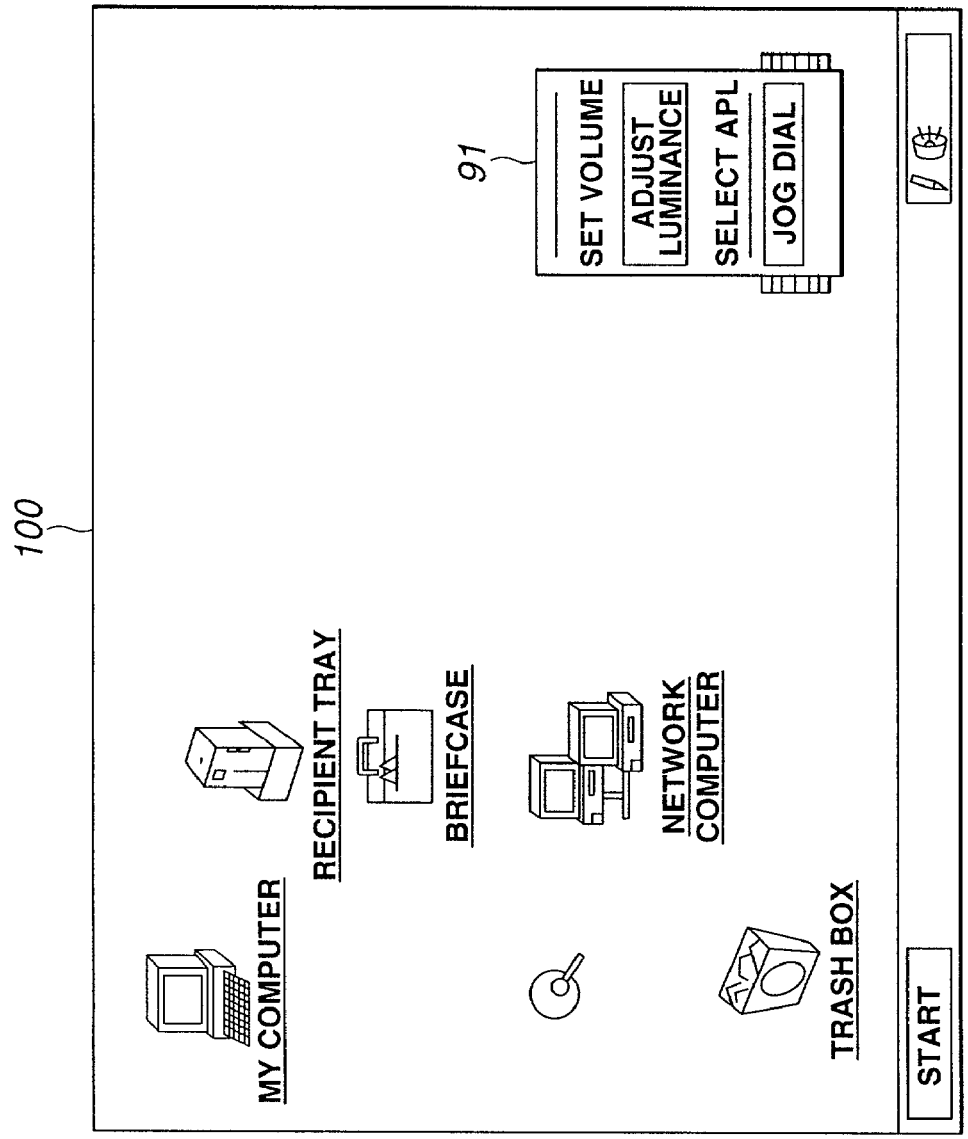
FIG. 35 shows a specific example of a jog dial window showing a launcher status on a window immediately after the start-up of the OS.

FIG. 35 shows a list view status 91 of the graphical user interface in a window 100 immediately after the OS is started up. This is a specific example of display on the display screen 3, of the list view status 91 shown in FIG. 4.

As is described above, by displaying the guide status 90 as the graphical user interface on the display screen 3, the notebook model personal computer NP can explain to the user what processing can be carried out currently in accordance with the input operation by the user using the operating unit 10. Moreover, by displaying the list view status 91 as the graphical user interface, the notebook model personal computer NP can explain to the user the items which can be executed in accordance with the input operation by the user using the operating unit 10.

Therefore, the user need not repeat troublesome operations until the notebook model personal computer NP executes the processing desired by the user, and the user-friendliness can be improved.

It is to be noted that the present invention is not limited to the notebook model personal computer and may also be applied to a portable information terminal device and a portable telephone device.

Figure 36:
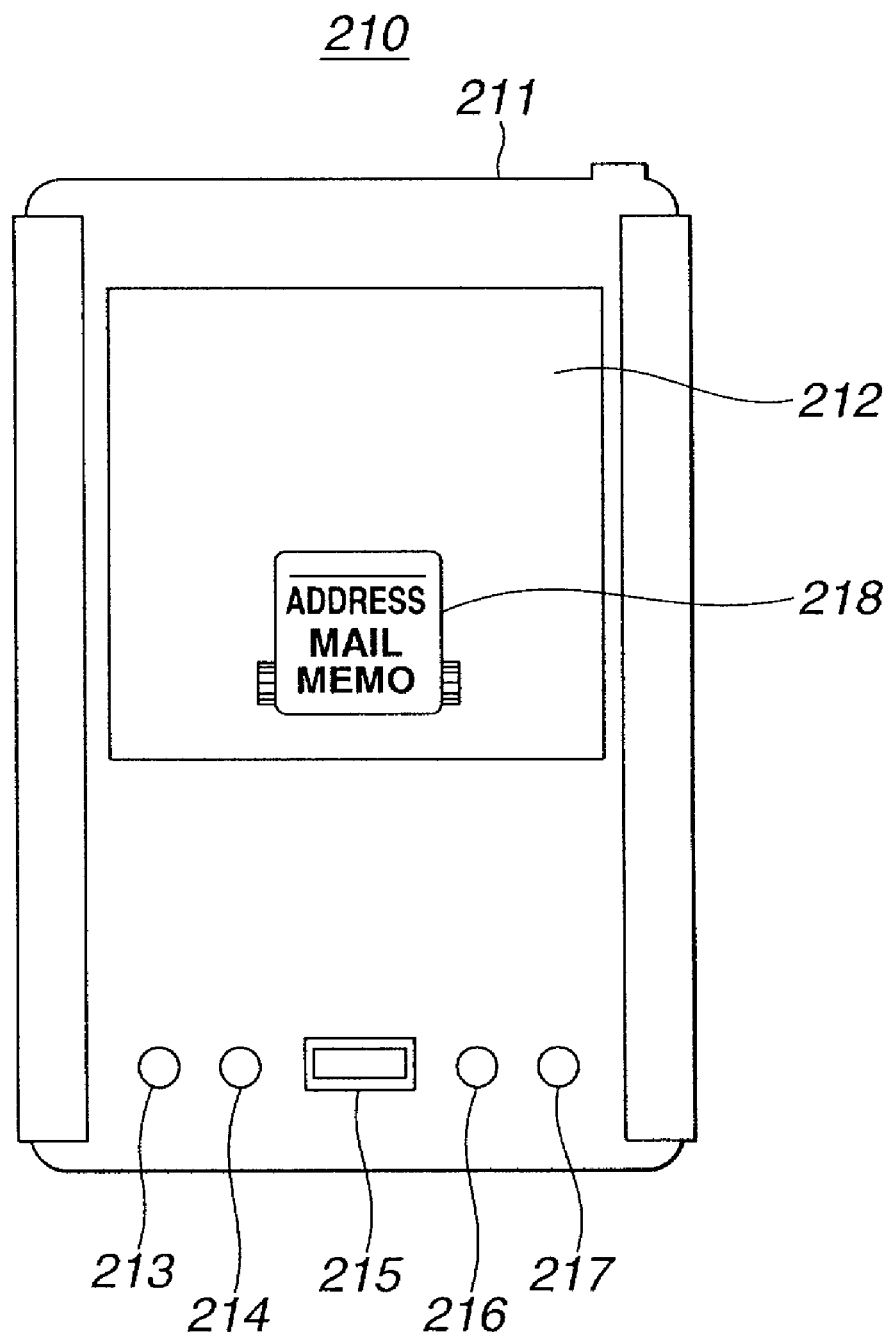
FIG. 36 is a plan view showing a portable information terminal device as another embodiment.

A portable information terminal device 210 shown in FIG. 36 has a display screen 212 made up of an LCD on the upper part of its body 211. On the lower part of the body 211, for example, a schedule button 213, an address book button 214, a "To Do" button 216 and a memo pad button 217 are provided. Moreover, an operating unit 215 having a rotating member similarly to the operating unit 10 is provided between the address book button 214 and the "To Do" button 216.

This portable information terminal device 210 has a CPU having an attached memory connected thereto via a bus, and has a display section, a character recognizing section, a sound recognizing section, a communication section and the like which are connected via buses, respectively.

The portable information terminal device 210 also has a speaker, an image pickup unit, and a microphone. A headphone terminal and line input and output terminals are provided, too. Therefore, the portable information terminal device 210 can carry out output/input of sounds and intake of images by image pickup. Moreover, the portable information terminal device 210 has an IEEE 1394 terminal and a USB terminal. Of course, the portable information terminal device 210 has a modem loaded thereon and can be connected to the Internet.

On the display screen 212, for example, a list view status 218 is displayed as the graphical user interface for explaining the operation of the operating unit 215 to the user through an image. Of course, a guide status is displayed, too, on the display screen 212 as the graphical user interface.

The above-described buttons, the displays on the display screen corresponding to the buttons, and the operation of the graphical user interface will now be described. The schedule button 213 is a button used for presenting on the display screen 212 a display which enables input and confirmation of the schedule, for example, every five minutes. The schedule input in this case is carried out by using a pen, not shown. The time can be shifted forward or back by input operation through the graphical user interface using the operating unit 215. The month and day may also be shifted.

The address book button 214 is a button used for displaying personal data such as the telephone number and address on the display screen 212. In this case, the respective data can be scrolled by input operation through the graphical user interface using the operating unit 215.

The "To Do" button 216 is a button used for listing and displaying items to be done such as work and business on the display screen 212. In this case, the respective items can be scrolled by input operation through the graphical user interface using the operating unit 215.

The memo pad button 217 is a button used for displaying a memo pad on the display screen 212 when the user wants to write down items that come across his/her mind. In this case, the respective items can be scrolled by input operation through the graphical user interface using the operating unit 215.

Figure 37:
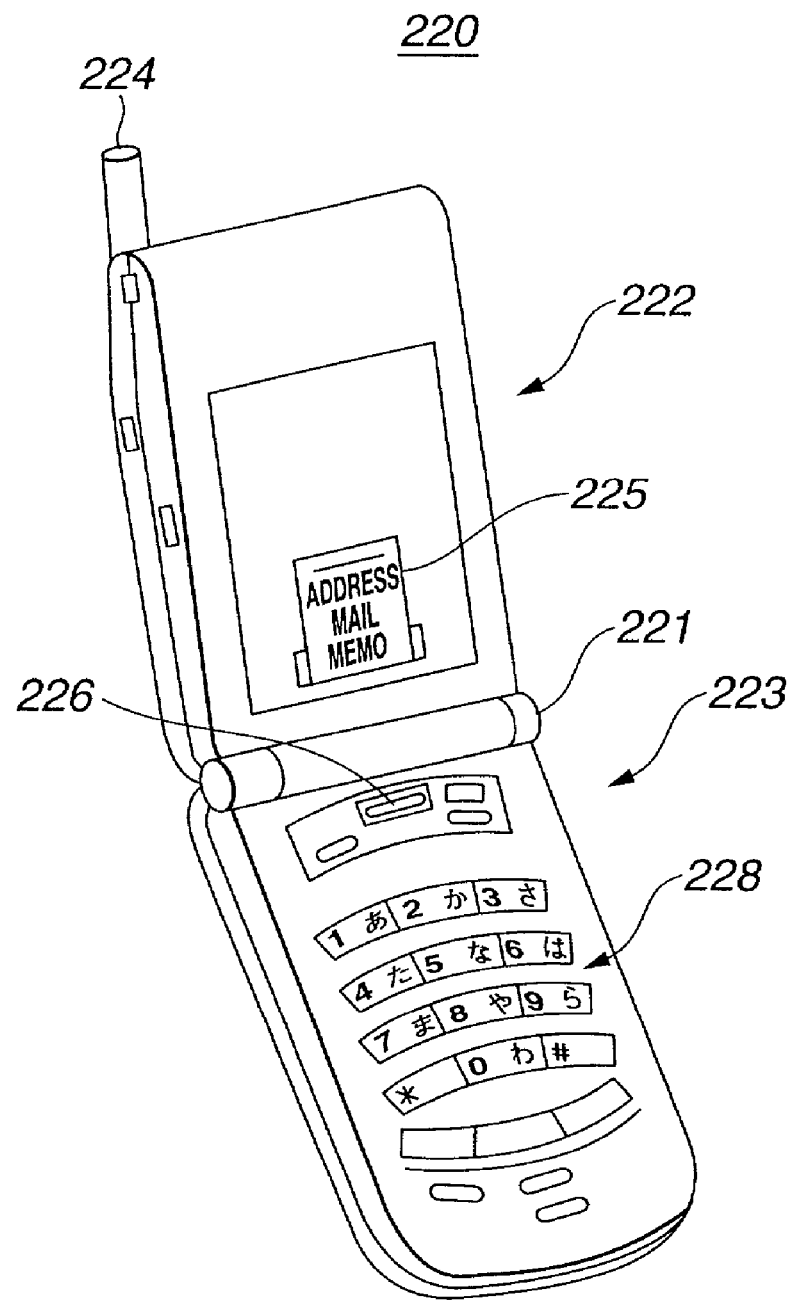
FIG. 37 is a perspective view showing a portable telephone device as still another embodiment.

A portable telephone device 220 shown in FIG. 37 is such a type that a display section 222 and a body 223 can be rotated around a rotary shaft 221. An antenna 224 is provided on the upper left side of the display section 222 and a display screen made up of an LCD is provided at the center. Operation keys 228 are arranged at the center of the body 223. On the upper part of the body 223, an operating unit 226 having a rotating member similarly to the operating unit 10 is provided.

On the display screen, for example, a list view status 225 is displayed as the graphical user interface used for explaining the operation of the operating unit 226 to the user through an image. Of course, a guide status is displayed, too, on the display screen as the graphical user interface.

For example, when carrying out processing to retrieve a registered telephone number on the display screen in accordance with the input operation by the user using the operating unit 226, a registered telephone number retrieval item is selected by rotating and pressing the operating unit 226 from the list view status of the graphical user interface. Moreover, scrolling up and down may be carried out through the guide status and the operating unit may be pressed to dial a selected telephone number.

Figure 38:
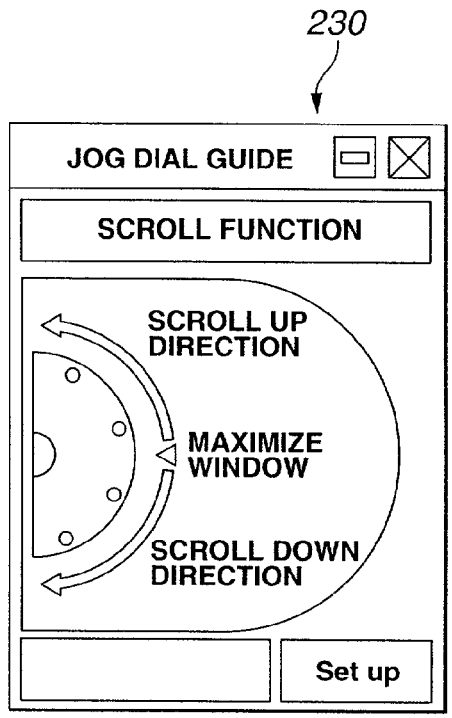
FIG. 38 shows another specific example of the guide status.
Figure 39:
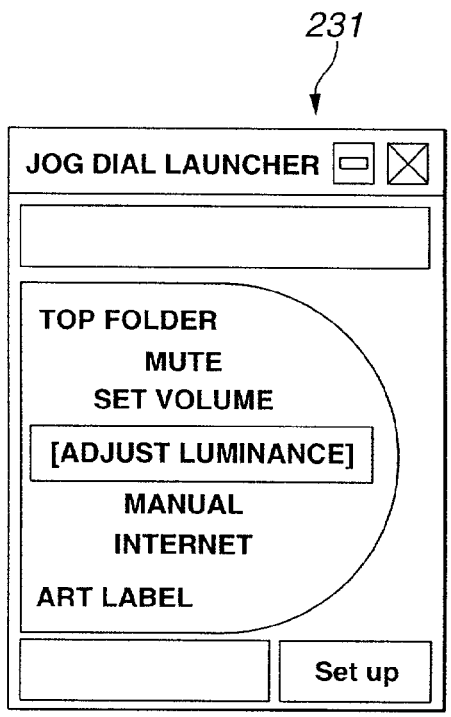
FIG. 39 shows another specific example of the list view status.

As the graphical user interface displayed on the display screens of the notebook model personal computer NP, the portable information terminal device 210 and the portable telephone device 220 and adapted for displaying the processing or item corresponding to the operation of the operating unit, a guide status 230 and a list view status 231 as shown in FIGS. 38 and 39 may also be employed.

Specifically, with the guide status 230 and the list view status 231 shown in FIGS. 38 and 39, what processing can be carried out currently by the notebook model personal computer NP, the portable information terminal device 210 and the portable telephone device 220 in accordance with the operation of the operating unit, or a list of items which can be carried out by the respective devices is displayed. Thus, the user need not repeat troublesome operations until each information processing device executes the processing desired by the user, and the user-friendliness can be improved.

A recording medium for providing the user with the program related to the graphical user interface according to the present invention may be a magnetic disk, a CD-ROM, a fixed memory and the like. The program may be realized through a communication medium such as a network or a satellite, in addition to the recording medium.

With the information input device according to the present invention, the user can cause the information processing device to execute desired processing simply by selecting the processing displayed in first display status through the rotation and press operation of the input device. Moreover, the user can cause the information processing device to execute a desired item simply by selecting the desired item from the list displayed in the second display status through the rotation and press operation of the input device. Therefore, the user need not repeat troublesome operations until the information processing device executes the desired processing, and the user-friendliness can be improved.

In the operation method for information processing device according to the present invention, at the first display step, the processing which the information processing device can currently carry out in accordance with the operation of the input device by the user is displayed. At the second display step, a list of items which can be executed on the information processing device is displayed in accordance with the operation of the input device. At the function execution step, the function selected at the first display step or the second display step is executed. Therefore, the user need not repeat troublesome operations until the information processing device executes the desired processing, and the user-friendliness can be improved.

The information processing device according to the present invention can execute the processing displayed in the first display status of the graphical user interface, as the user only selects the processing by the rotation and press operation of the input device. Moreover, the information processing device can execute an item desired by the user, as the user only selects the desired item from the list displayed in the second display status by the rotation and press operation of the input device. Therefore, the user need not repeat troublesome operations until the information processing device executes the desired processing, and the user-friendliness can be improved.

The recording medium according to the present invention has recorded thereon a graphical user interface processing program comprising a first display step of displaying what processing the information processing device can currently carry out in accordance with the operation using the input device and a second display step of displaying a list of items which can be executed on the information processing device in accordance with the operation using the input device. Therefore, with the information processing device having this recording medium loaded thereon, the user need not repeat troublesome operations until the information processing device executes the desired processing, and the user-friendliness can be improved.

The program according to the present invention comprises a first display step of displaying what processing the information processing device can currently carry out in accordance with the operation using the input device and a second display step of displaying a list of items which can be executed on the information processing device in accordance with the operation using the input device. Therefore, with the information processing device which executes this program, the user need not repeat troublesome operations until the information processing device executes the desired processing, and the user-friendliness can be improved.

What is claimed is:

1. An information input device for, while displaying an image, carrying out an input operation by a user using an input device for carrying out rotation and press operations near a plurality of click buttons, the information input device comprising:
   a first display status for displaying what processing an information processing device can currently carry out in accordance with the operation using the input device; and
   a second display status for displaying a list of items for execution on the information processing device in accordance with the operation using the input device;
   wherein the input device is situated near the plurality of click buttons such that the plurality of click buttons and the input device are manipulated with one hand;
   wherein rotation of the input device in a direction causes apparent movement in substantially the same direction of the first and/or second display status;
   wherein the first display status and the second display status further comprise extending a wound band-shaped display area of a roll-shaped image in a direction perpendicular to the direction of rotation of the input device; and
   wherein the display area in an initial state is extended in a direction parallel to the direction of rotation of the input device as a user touches the input device.

2. The information input device as claimed in claim 1, wherein the first display status is a guide status for guiding the operation of an application program, and the second display status is a list view status for displaying a list of application programs to be selected.

3. The information input device as claimed in claim 1, wherein the second display status includes at least two stages of display status made up of a primary hierarchical display and a secondary hierarchical display.

4. The information input device as claimed in claim 3, wherein the primary hierarchical display and the second hierarchical display can be discriminated from each other.

5. The information input device as claimed in claim 1, wherein the first display status and the second display status are formed as areas which expand and contract in a direction parallel to the direction of rotation of the input device and are horizontally symmetrical.

6. An operation method for an information processing device for operating the information processing device while explaining, to a user through an image, the operation on the information processing device of an input device for carrying out rotation and press operations near a plurality of click buttons, the method comprising:

a first display step of displaying what processing the information processing device can currently carry out in accordance with the operation using the input device;

a second display step of displaying a list of items for execution on the information processing device in accordance with the operation using the input device; and a function execution step of executing the processing or item selected at the first display step or the second display step;

wherein the plurality of click buttons and the input device can be manipulated with one hand;

wherein rotation of the input device causes apparent movement in substantially the same direction of displayed information in the first and/or second display step;

wherein the first display step and the second display step further comprise extending a wound band-shaped display area of a roll-shaped image in a direction perpendicular to the direction of rotation of the input device; and wherein the display area in an initial state is extended in a direction parallel to the direction of rotation of the input device as a user touches the input device.

7. An operation method as claimed in claim 6, wherein the first display step and the second display step display areas which expand and contract in a direction parallel to the direction of rotation of the input device and are horizontally symmetrical.

8. An information processing device comprising:

an input device for carrying out rotation and press operations near a plurality of click buttons; and a graphical user interface having a first display status for displaying what processing the information processing device can currently carry out in accordance with the operation using the input device, and a second display status for displaying a list of items which can be executed on the information processing device in accordance with the operation using the input device;

wherein the operation status in the input device is monitored and the graphical user interface corresponding to each operation is displayed onto a display unit, and information processing corresponding to said each operation is carried out;

wherein the input device is situated near the plurality of click buttons such that the plurality of click buttons and the input device are manipulated with one hand;

wherein rotation of the input device in a direction causes apparent movement in substantially the same direction of the first and/or second display status;

wherein the first display status and the second display status further comprise extending a wound band-shaped display area of a roll-shaped image in a direction perpendicular to the direction of rotation of the input device; and wherein the display area in an initial state is extended in a direction parallel to the direction of rotation of the input device as a user touches the input device.

9. The information processing device as claimed in claim 8, wherein the first display status of the graphical user interface is a guide status for guiding the operation of an application program, and the second display status is a list view status for displaying a list of application programs to be selected.

10. The information processing device as claimed in claim 9, wherein the second display status includes at least two stages of display status made up of a primary hierarchical display and a secondary hierarchical display.

11. The information processing device as claimed in claim 10, wherein the primary hierarchical display and the second hierarchical display can be discriminated from each other.

12. The information processing device as claimed in claim 8, wherein the first display status and the second display status are formed as areas which expand and contract in a direction parallel to the direction of rotation of the input device and are horizontally symmetrical.

13. A recording medium having recorded thereon a graphical user interface processing program for explaining, to a user through an image, the operation on an information processing device of an input device for carrying out rotation and press operations near a plurality of click buttons, the graphical user interface processing program comprising:

a first display step of displaying what processing the information processing device can currently carry out in accordance with the operation using the input device; and a second display step of displaying a list of items for execution on the information processing device in accordance with the operation using the input device;

wherein the plurality of click buttons and the input device are manipulated with one hand;

wherein rotation of the input device in a direction causes apparent movement in substantially the same direction of displayed information in the first and/or second display step;

wherein the first display step and the second display step further comprise extending a wound band-shaped display area of a roll-shaped image in a direction perpendicular to the direction of rotation of the input device; and wherein the display area in an initial state is extended in a direction parallel to the direction of rotation of the input device as a user touches the input device.

14. A program related to graphical user interface processing for explaining, to a user through an image, the operation on an information processing device of an input device for carrying out rotation and press operations near a plurality of click buttons, the program comprising:

a first display step of displaying what processing the information processing device can currently carry out in accordance with the operation using the input device; and a second display step of displaying a list of items for execution on the information processing device in accordance with the operation using the input device;

wherein the plurality of click buttons and the input device are manipulated with one hand;

wherein rotation of the input device in a direction causes apparent movement in substantially the same direction of displayed information in the first and/or second display step;

wherein the first display step and the second display step further comprise extending a wound band-shaped display area of a roll-shaped image in a direction perpendicular to the direction of rotation of the input device; and wherein the display area in an initial state is extended in a direction parallel to the direction of rotation of the input device as a user touches the input device.

* * * * *